United States Patent [19]

Nakazawa et al.

[11] Patent Number: 5,625,885

[45] Date of Patent: Apr. 29, 1997

[54] MOBILE COMMUNICATION SYSTEM HAVING PAGERS FOR PROVIDING TWO-WAY DATA COMMUNICATION BETWEEN A BASE STATION AND MOBILE STATIONS

[75] Inventors: Isao Nakazawa; Osamu Morita, both of Kawasaki, Japan

[73] Assignee: Fujitsu Limited, Kanagawa, Japan

[21] Appl. No.: 277,417

[22] Filed: Jul. 18, 1994

[30] Foreign Application Priority Data

Dec. 15, 1993 [JP] Japan ..................................... 5-314202

[51] Int. Cl.$^6$ ..................................................... H04B 7/04
[52] U.S. Cl. .................. 455/54.1; 455/32.1; 455/33.3; 455/38.1; 340/825.44; 379/59
[58] Field of Search .................. 455/54.1, 32.1, 455/33.1, 33.3, 38.1, 38.3, 56.1, 161.1, 227, 25; 340/825.44, 824.47; 370/95.3; 379/59, 63

[56] References Cited

U.S. PATENT DOCUMENTS

| | | | |
|---|---|---|---|
| 4,549,311 | 10/1985 | McLaughlin | 455/277.1 |
| 4,679,225 | 7/1987 | Higashiyama | 379/62 |
| 4,928,096 | 5/1990 | Leonardo et al. | 340/825.44 |
| 4,940,963 | 7/1990 | Gutman et al. | 340/313 |
| 5,162,790 | 11/1992 | Jasinki | 380/825.44 |
| 5,260,700 | 11/1993 | Merchant et al. | 340/825.44 |
| 5,303,240 | 4/1994 | Borras et al. | 370/95.3 |

Primary Examiner—Chi H. Pham
Assistant Examiner—Lee Nguyen

[57] ABSTRACT

A mobile communication system has a base station and a plurality of mobile stations. When a mobile station detects a self station code, it transmits the self station code of the mobile station to the base station by using weak radio waves. The base station performs scanning, using its scanning antenna so as to change the directivity direction, catches the weak radio waves sent from the mobile station, and detects the mobile station code included in the reception signal. Thereby, a requester is told that the call of the mobile station has surely been made. By using the scanning antenna, a notification that the mobile station has surely received the call from the base station is reliably conveyed from the mobile station to the base station by using weak radio waves.

9 Claims, 26 Drawing Sheets

MOBILE COMMUNICATION SYSTEM HAVING PAGERS FOR PROVIDING TWO-WAY DATA COMMUNICATION BETWEEN A BASE STATION AND MOBILE STATIONS

BACKGROUND OF THE INVENTION (1) Field of the Invention

The present invention relates to a mobile communication system having a base station and a plurality of mobile stations, and more particularly to a mobile communication system having pagers which provide a two-way data and communication and have various transmission capacities.

(2) Description of the Related Art

Generally, a selective calling radio system, called a paging system, has one base station covering a wide zone and offers selective calling service, for example, to 30,000 or more mobile stations (pagers) by using one radio frequency. Specifically, a base station transmits a selection signal (ID code) and a message in response to calling from a general subscriber. On the other hand, a pager, detecting the ID code of self station among the received signals, tells that the self station is being called by means of a lamp or a buzzer, and displays the message following the ID code on a built-in liquid crystal display, etc.

In such a paging system, a pager cannot be called from a base station when the pager is located in an area where radio waves do not reach (for example, in a subway, a tunnel, an area beyond the service area, etc.), or when pager power is turned off (for example, during a conference, a concert, etc.). However, the base station cannot know that the pager is in a condition where the calling is impossible. This is because the communication from the base station to the pager is a one-way communication.

For this reason, a pager which allows a two-way communication and has an individual transmission capacity has been developed. When a pager of this type is called from a base station, the pager transmits the ID code of the self station to the base station so that it tells that it has surely received the call.

However, the conventional pager which allows two-way data communication requires a considerable amount of electric power for transmitting the ID code to the base station, and therefore requires a large-scale circuit configuration of the transmission section. These requirements are contrary to the advantages of pagers where the battery can be used for a long time and the portability is excellent in terms of shape and weight. Therefore, the solution to these problems has been demanded.

SUMMARY OF THE INVENTION

An object of the present invention is to provide a mobile communication system which allows a two-way data communication and comprises mobile stations which have low power consumption and a small-scale circuit configuration.

To achieve the above object, the present invention provides a mobile communication system having a base station and a plurality of mobile stations. This mobile communication system comprises a self station code detecting means, which is installed in the mobile station, for detecting transmission of a self station code from the base station; a self station code transmitting means, which is installed in the mobile station, for transmitting the self station code to the base station when the self station code detecting means detects the transmission of the self station code from the base station; a scanning antenna, which is installed in the base station, and has a directivity, for scanning and can scan the directivity directions; and a mobile station code detecting means, which is installed in the base station, for detecting a mobile station code included in the signals received by the scanning antenna.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
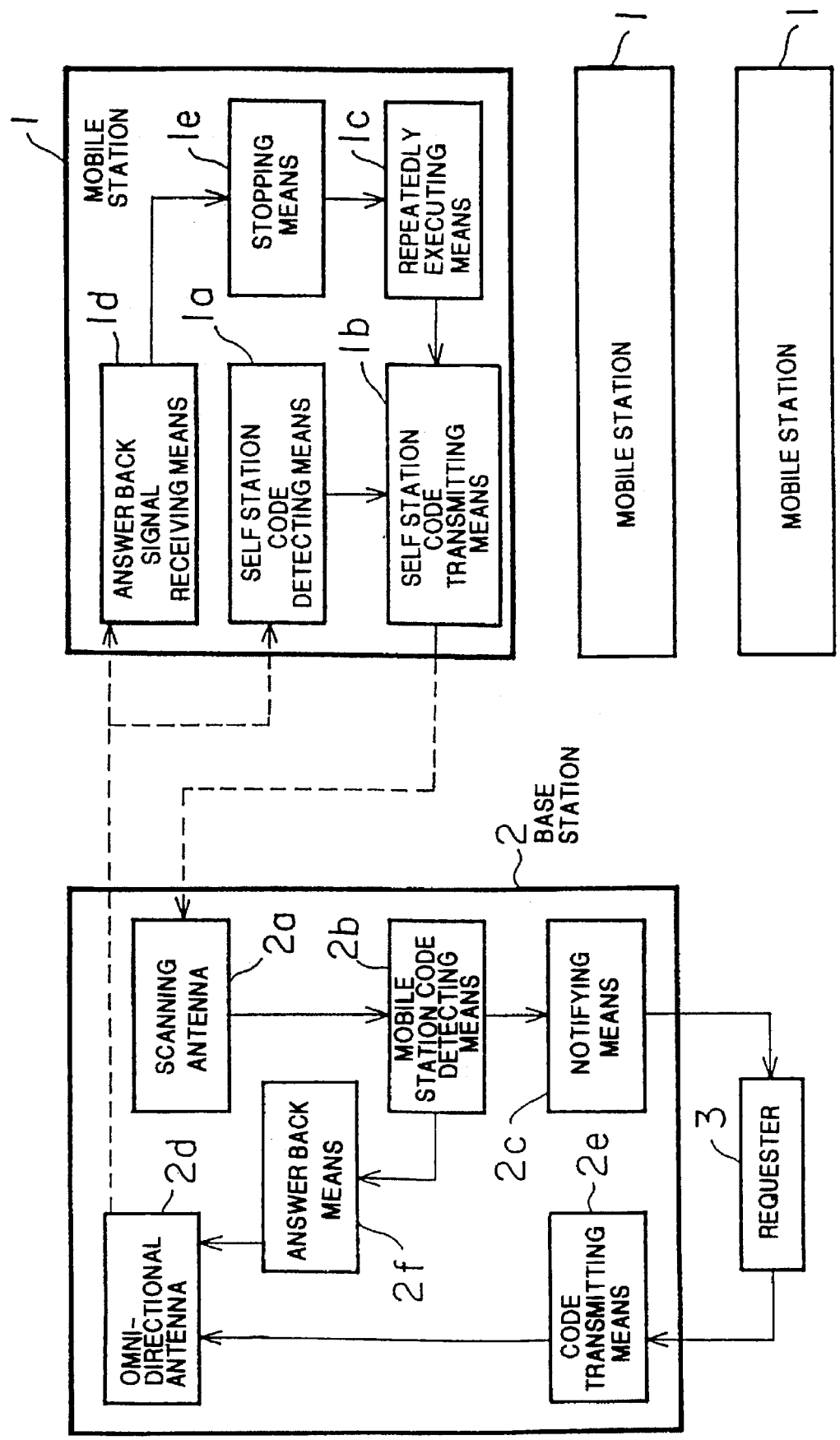
FIG. 1 is a view for illustrating the principle of the present invention.

First, the principle of the present invention will be described with reference to FIG. 1.

The present invention provides a mobile communication system having a base station and a plurality of mobile stations. This mobile communication system comprises a self station code detecting means 1a, which is installed in the mobile station, for detecting the transmission of a self station code from the base station 2; a self station code transmitting means 1b, which is installed in the mobile station, for transmitting the self station code to the base station 2 when the self station code detecting means 1a detects the transmission of the self station code from the base station 2; a scanning antenna 2a, which is installed in the base station 2, has a directivity, for scanning the directivity directions; and a mobile station code detecting means 2b, which is installed in the base station 2, for detecting a mobile station code included in the signals received by the scanning antenna 2a.

This mobile communication system further comprises a notifying means 2c, which is installed in the base station 2, for telling a requester 3, who asks the call of mobile station corresponding to the mobile station code detected by the mobile station code detecting means 2b, that the call has surely been made.

The mobile communication system further comprises an omnidirectional antenna 2d, which is installed in the base station 2, has no directivity, and transmits the transmission signal including the mobile station code to all directions.

The mobile communication system still further comprises a code transmitting means 2e, which is installed in the base station 2, for transmitting the code of a predetermined mobile station from the omnidirectional antenna 2d upon request for calling a predetermined mobile station.

The mobile communication system still further comprises an answer back means 2f, which is installed in the base station 2, for transmitting the mobile station code detected by the mobile station code detecting means 2b and an answer back signal from the omnidirectional antenna 2d when the mobile station code detecting means 2b detects the mobile station code; a repeatedly executing means 1c, which is installed in the mobile station 1, for making the self station code transmitting means 1b execute the transmission of self station code to the base station 2 repeatedly; an answer back signal receiving means 1d, which is installed in the mobile station 1, for receiving the mobile station code and the answer back signal for the self station from the answer back means 2f of the base station 2; and a stopping means 1e, which is installed in the mobile station 1, for stopping the operation of the repeatedly executing means 1c to stop the transmission of self station code to the base station 2 performed by the self station code transmitting means 1b when the answer back signal receiving means 1d receives the mobile station code and the answer back signal for the self station.

The aforementioned mobile station 1 is not limited to a pager, and may be a general mobile communication device which is capable of a two-way radio communication.

In the above configuration, the code transmitting means 2e of the base station 2 first receives a request for calling a predetermined mobile station from a requester 3, so that a predetermined code of mobile station is transmitted from the omnidirectional antenna 2d.

The self station code detecting means 1a of the mobile station 1 receives the signals sent from the omnidirectional antenna 2d, and judges whether the self station code is included in them. When the self station code is detected, the self station code transmitting means 1b transmits the self station code of the mobile station 1 to the base station 2 by using weak radio waves. This transmission is executed repeatedly by the repeatedly executing means 1c.

At the base station 2, mobile station code detecting means 2b changes the directivity direction by the scanning of the scanning antenna 2a so that weak radio waves from the mobile station 1 are caught, so that the mobile station code included in the signals received by the scanning antenna 2a is detected. When the mobile station code detecting means 2b detects the mobile station code, the notifying means 2c tells the requester 3 that the call of the mobile station corresponding to the mobile station code detected by the mobile station code detecting means 2b has surely been made. Further, the answer back means 2f transmits the mobile station code detected by the mobile station code detecting means 2b and the answer back signal from the omnidirectional antenna 2d.

On the other hand, the answer back signal receiving means 1d of the mobile station 1 receives the mobile station code and the answer back signal for the self station from the answer back means 2f of the base station 2. By this reception, the stopping means 1e stops the operation of the repeatedly executing means 1c, so that the transmission of the self station code to the base station 2 performed by the self station code transmitting means 1b is stopped.

Thus, a notification that the mobile station 1 has surely received the call from the base station 2 is reliably conveyed from the mobile station 1 to the base station 2 by using weak radio waves. By using the scanning antenna 2a, weak radio waves may be used for the transmission from the mobile station 1 to the base station 2. Therefore, the mobile station 1 requires low power consumption and small-scale configuration of transmission circuit because weak radio waves are transmitted.

Next, the embodiments of the present invention will be described in detail.

Figure 2:
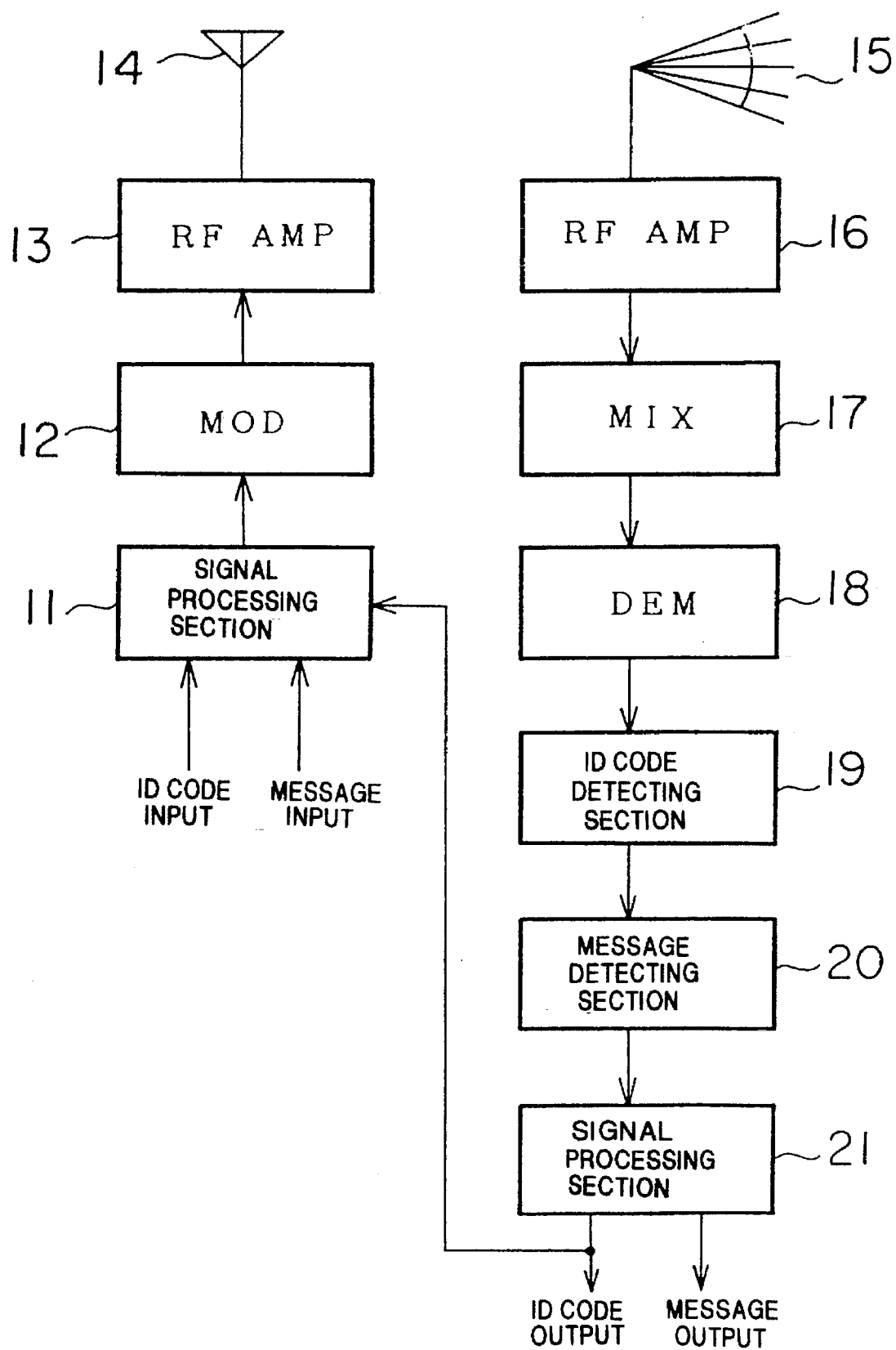
FIG. 2 is a block diagram of a base station of a first embodiment.

FIG. 2 is a block diagram of a base station of a first embodiment.

First, an ID code signal and a message signal are inputted by a call requester to a base station via main lines. The ID code signal is a signal of a code applied individually to each pager to identify the pager. The message signal is a signal of numerals and characters asked by the requester to display on a liquid crystal display, etc. These signals are synthesized at a signal processing section 11, and a unique word (UW) signal indicating the position reference of burst is added to them. They are FSK modulated at a modulating section 12, and the modulated carrier is amplified at an amplifying section 13 to output from an omnidirectional antenna 14. This omnidirectional antenna 14 has a substantially uniform directivity for the service zone. The service zone is not always 360 degrees around the omnidirectional antenna 14.

In addition, the base station includes a scanning antenna 15. The scanning antenna 15 is a phase array antenna which has a sharp directivity and can scan the directivity directions by electron scanning. The scanning antenna 15 may be an antenna which can scan the directions by mechanical scanning.

Figure 4:
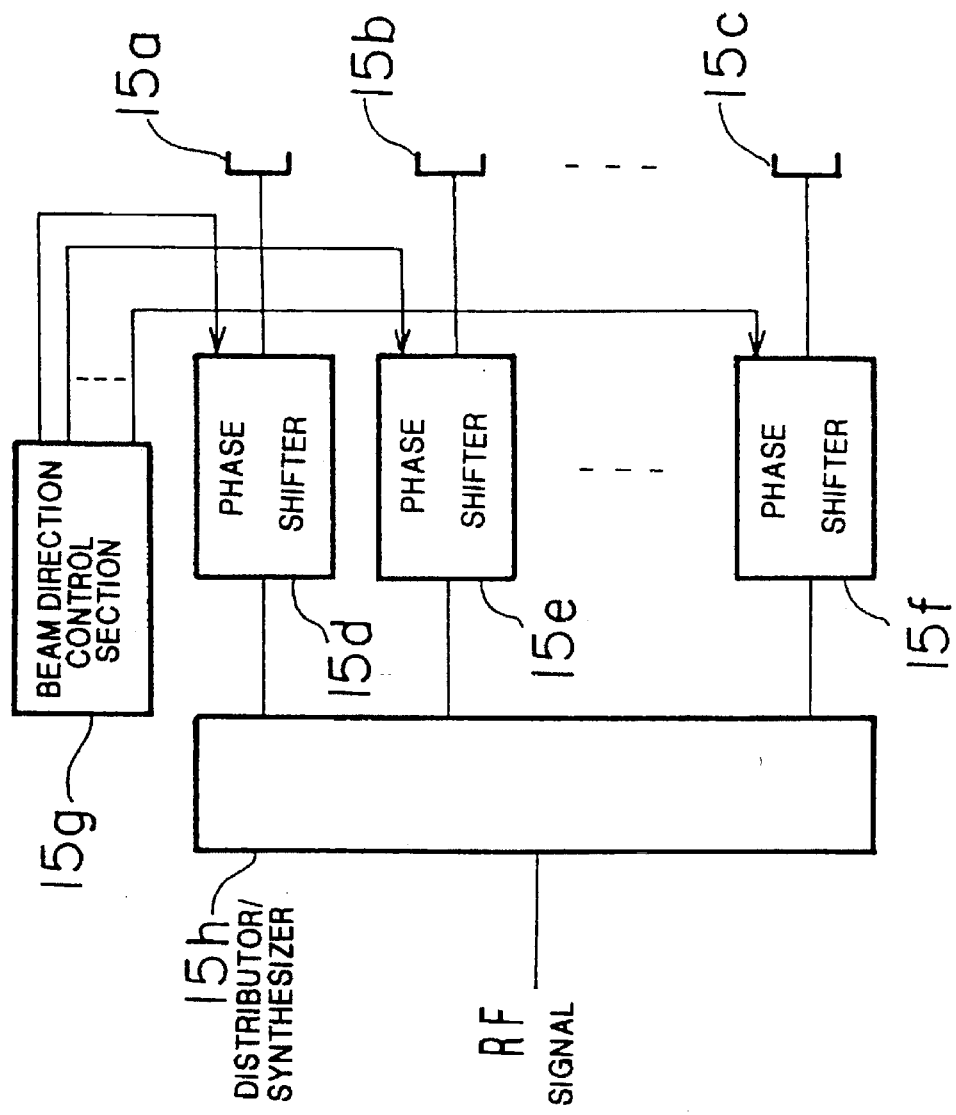
FIG. 4 is a configuration diagram of scanning antenna.

FIG. 4 is a block diagram of a phase array antenna of this embodiment. The phase array antenna comprises a plurality of unit antennas 15a to 15c which consist of a dipole, etc. and arranged in a predetermined space, a plurality of phase shifters 15d to 15f which are connected to the unit antennas 15a to 15c, respectively, a beam direction control section 15g connected to the plural phase shifters 15d to 15f, and a distributor/synthesizer 15h connected to plural phase shifters 15d to 15f. The beam direction control section 15g controls the phase shifters 15d to 15f individually. Thereby, the directivity produced integrally by the whole of the unit antennas 15a to 15c becomes sharp, and the scanning can be performed by changing the directivity direction with time.

Referring back to FIG. 2, the modulated carrier, described later, which is received by the scanning antenna 15 is amplified by an RF amplifying section 16, converted into an IF signal by the converting section 17, and FSK demodulated at the demodulating section 18. The demodulated signal includes the ID code signal and the message signal, which are sent from the pager. The ID code signal is detected by an ID code detecting section 19, whereas the message signal is detected by a message detecting section 20. A following signal processing section 21 tells the requester who asked the call of the pager corresponding to the detected ID code that the call has been surely made, and transmits the detected message the requester. Further, the signal processing section 21 adds an answer back signal to the detected ID code signal and sends it to the signal processing section 11. The answer back signal is a signal for informing the pager that the base station has received and confirmed the reception confirming signal sent from the pager. The ID code signal and the answer back signal are outputted from the omnidirectional antenna 14 through the signal processing section 11, modulating section 12, and RF amplifying section 13.

Figure 3:
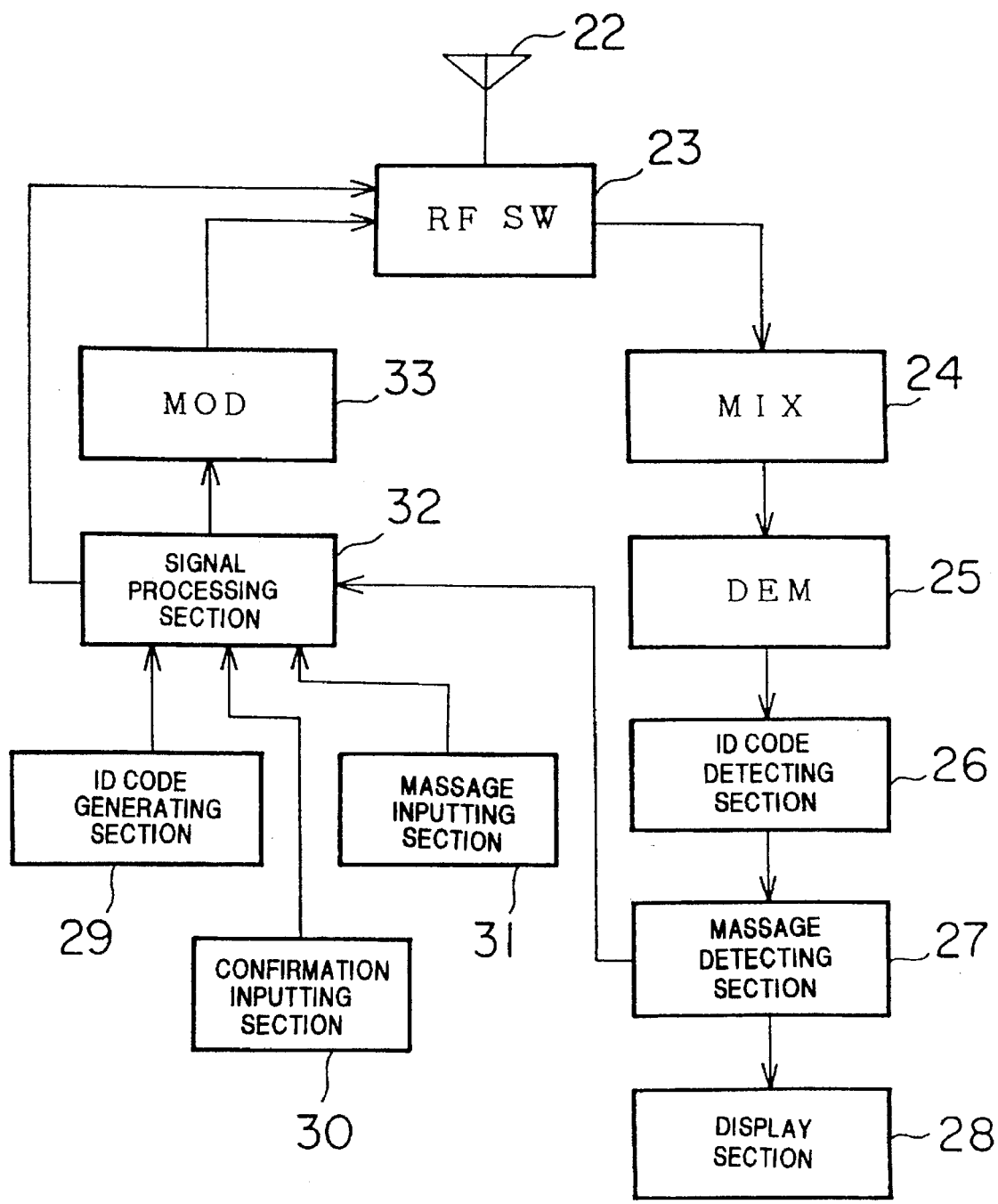
FIG. 3 is a block diagram of a pager of a first embodiment.

FIG. 3 is a block diagram for a pager of a first embodiment.

First, an antenna 22 is used for both transmission and reception, and an RF switching section 23 switches transmission and reception. The RF switching section 23 is positioned on the reception side at all times unless the transmission switching signal, described later, is inputted. The received RF modulated carrier signal is converted into an IF signal at a converting section 24, and FSK demodulated at a demodulating section 25. The demodulated signal includes the ID code signal and the message signal or the answer back signal, which are sent from the base station. An ID code detecting section 26 detects the ID code signal from the demodulated signals, and judges whether the pager corresponding to this ID code signal is the self station. If it is not the self station, nothing is done, whereas if it is the self station, the demodulated signal is sent to a message detecting section 27. The message detecting section 27 detects the message signal or the answer back signal, which is added to the ID code signal. If the message signal is detected, it is sent to a display section 28. The display section 28 displays characters on the liquid crystal display, and informs the pager holder about the arrival of the call by sounding a buzzer. If an answer back signal is detected, the message detecting section 27 sends the answer back signal to a signal processing section 32.

An ID code generating section 29, a confirmation inputting section 30, and a message inputting section 31 as well as the message detecting section 27 are to the signal processing section 32. The ID code generating section 29 generates the self station ID code signal of the pager. The confirmation inputting section 30 is an input device for inputting a confirmation signal when the pager holder confirms the arrival of the call. The message inputting section 31 is an input device for inputting the message to be sent to the call requester when the pager holder confirms the arrival of the call. At the signal processing section 32, when a confirmation signal is inputted from the confirmation inputting section 30, a message from the message inputting section 31 is added to the self station ID code signal from the ID code generating section 29, and a unique word is added to the signal. Then, the signal is outputted to the modulating section 33. This output is executed repeatedly. The signal processing section 32 stops the repeated execution of the output upon receipt of the answer back signal from the message detecting section 27. Incidentally, the signal processing section 32 outputs a transmission switching signal to the RF switching section 23 when an output signal is outputted to the modulating section 33.

The modulating section 33 transmits the signal sent from the signal processing section 32 to the RF switching section 23 after FSK modulating it. At this time, since a transmission switching signal is sent from the signal processing section 32 to the RF switching section 23, the RF modulated waves sent from the modulating section 33 are outputted from an antenna 22.

Figure 5:
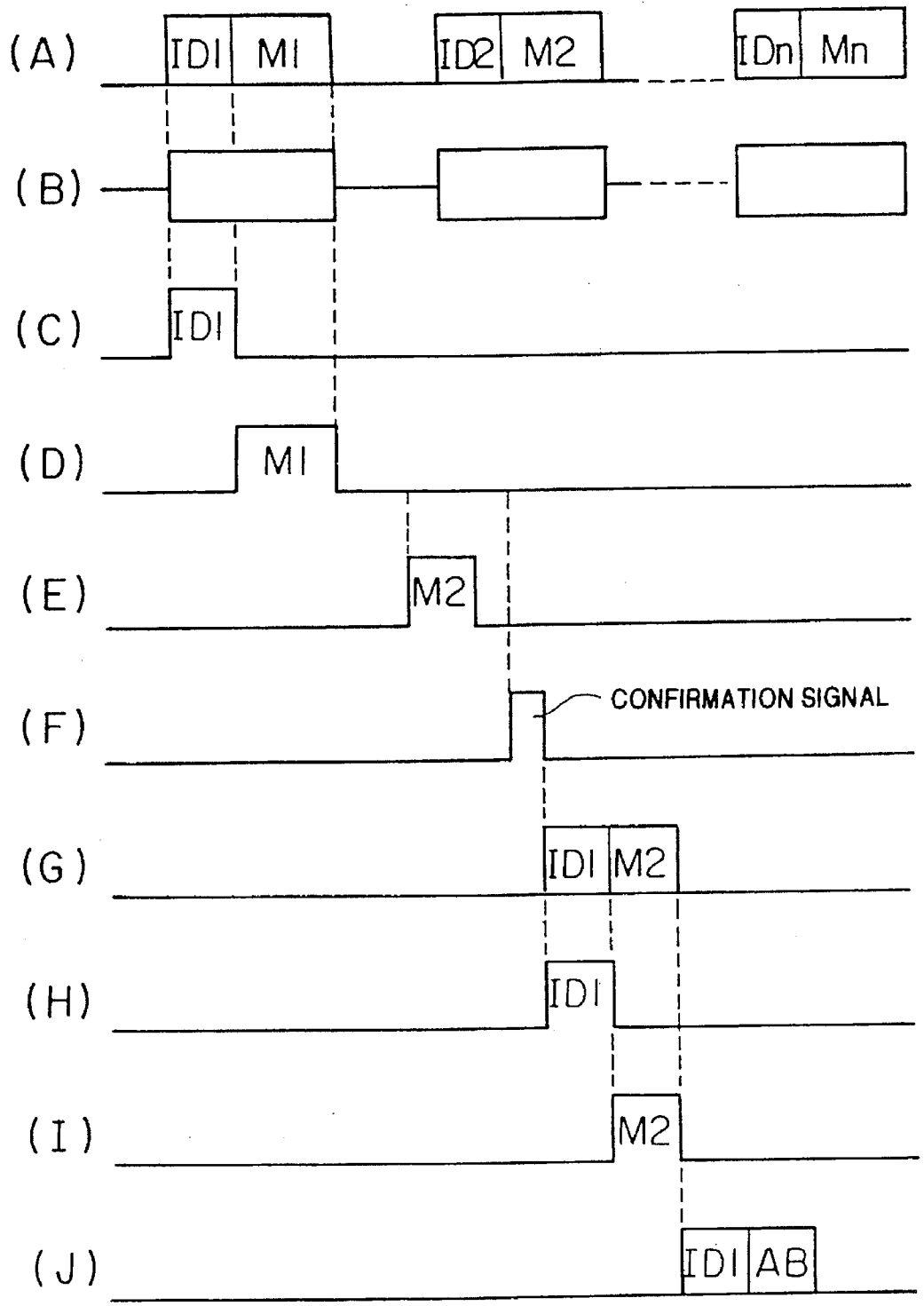
FIG. 5 is a timing chart for signals.

The operation of the base station and the pager, which are constituted as described above, will be described with reference to FIG. 5. FIG. 5 is a timing chart of signals of the base station and the pager.

First, at the signal processing section 11 in FIG. 2, a signal which calls the pager of ID code ID1 and tells the message M1, a signal which calls the pager of ID code ID2 and tells the message M2, . . . a signal which calls the pager of ID code IDn and tells the message Mn [FIG. 5(A)] are prepared. These signals are transmitted from the omnidirectional antenna 14 to the antenna of each pager as burst signals [FIG. 5(B)]. This transmission output is equivalent to the transmission output of the conventional base station.

The antenna 22 of the pager shown in FIG. 3 receives these burst signals, and sends them to the ID code detecting section 26 through the RF switching section 23, the converting section 24, and the demodulating section 25. Here, the ID code of the pager in FIG. 3 is assumed to be ID1. Then, the ID code detecting section 26 detects the self station code ID1 [FIG. 5(C)], and the message detecting section 27 detects the message M1 [FIG. 5(D)].

The pager holder, after watching the message shown on the display section 28, inputs the message M2 [FIG. 5(E)] directed to the call requester to the message inputting section 31, and then inputs the confirmation signal [FIG. 5(E)] from the confirmation inputting section 30. Upon receipt of the confirmation signal, the signal processing section 32 transmits the reception confirmation signal [FIG. 5(G)] consisting of the self station code ID1, the message M2, etc. from the antenna 22 through the modulating section 33 and the RF switching section 23. This transmission output is relatively weak. The output of the reception confirmation signal from the signal processing section 32 to the modulating section 33 is executed repeatedly.

The scanning antenna 15 of the base station in FIG. 2 scans and controls the directivity direction so that the directivity direction is opposed to all service zones. Therefore, even if the pager is anywhere in the service zone, the scanning antenna 15 has a chance of receiving radio waves transmitted from the pager once in one scanning period. Moreover, the scanning antenna 15 can receive even weak radio waves sent from the pager because of its sharp directivity. Even if the scanning antenna 15 cannot receive the radio waves in one scanning period, it can always receive the reception confirmation signal because the reception confirmation signal is repeatedly transmitted.

The signal which is sent from the pager shown in FIG. 3 and received by the scanning antenna 15 is sent to the ID code detecting section 19 and the message detecting section 20 via the RF amplifying section 16, the converting section 17, and the demodulating section 18. The ID detecting section 19 detects the ID code ID1 [FIG. 5(H)], whereas the message detecting section 20 detects the message M2 [FIG. 5(I)]. The signal processing section 21 tells the requester that the call is surely accomplished, and conveys the message M2 to the requester. Further, the signal processing section 21 adds an answer back signal AB to the detected ID code signal ID1, and sends the signals to the signal processing section 11. The ID code signal ID1 and the answer back signal AB [FIG. 5(J)] are outputted as burst signals from the omnidirectional antenna 14 via the signal processing section 11, the modulating section 12 and the RF amplifying section 13.

These burst signals are received by the antenna 22 of the pager shown in FIG. 3, and sent to the ID code detecting section 26 via the RF switching section 23, the converting section 24 and the demodulating section 25. The ID code detecting section 26 detects the self station code ID1, whereas the message detecting section 27 detects the answer back signal AB. The answer back signal AB is sent to the signal processing section 32, by which the signal processing section 32 stops the output of reception confirmation signal to the modulating section 33.

As described above, the installation of the scanning antenna at the base station allows the reception confirmation signal to be transmitted to the base station even if weak radio waves are sent from the pager. This permits the two-way data communication and provides a pager with low power consumption. The decrease in power consumption of the pager contributes to a small scale of circuit configuration and compactness and lightweight of the pager.

Although the modulating sections 12 and 33, and the demodulating sections 18 and 25 perform FSK modulation and FSK demodulation, respectively, in the first embodiment, other modulation/demodulation systems, such as DPSK or QPSK, may be used.

Further, although a signal is sent by adding messages M1 and M2 to the ID code in the first embodiment, the addition of the messages is not always required. This embodiment can be carried out without the addition of the messages.

Still further, in the first embodiment, the signal processing section 32 of the pager repeatedly outputs a reception confirmation signal to the modulating section 33. However, though the repeated outputs provide an effective method for surely transmitting the reception confirmation signal to the base station, it is not always a prerequisite. Therefore, the answer back signal outputted by the signal processing section 21 of the base station is also not always a prerequisite.

Next, a second embodiment of the present invention will be described.

Figure 6:
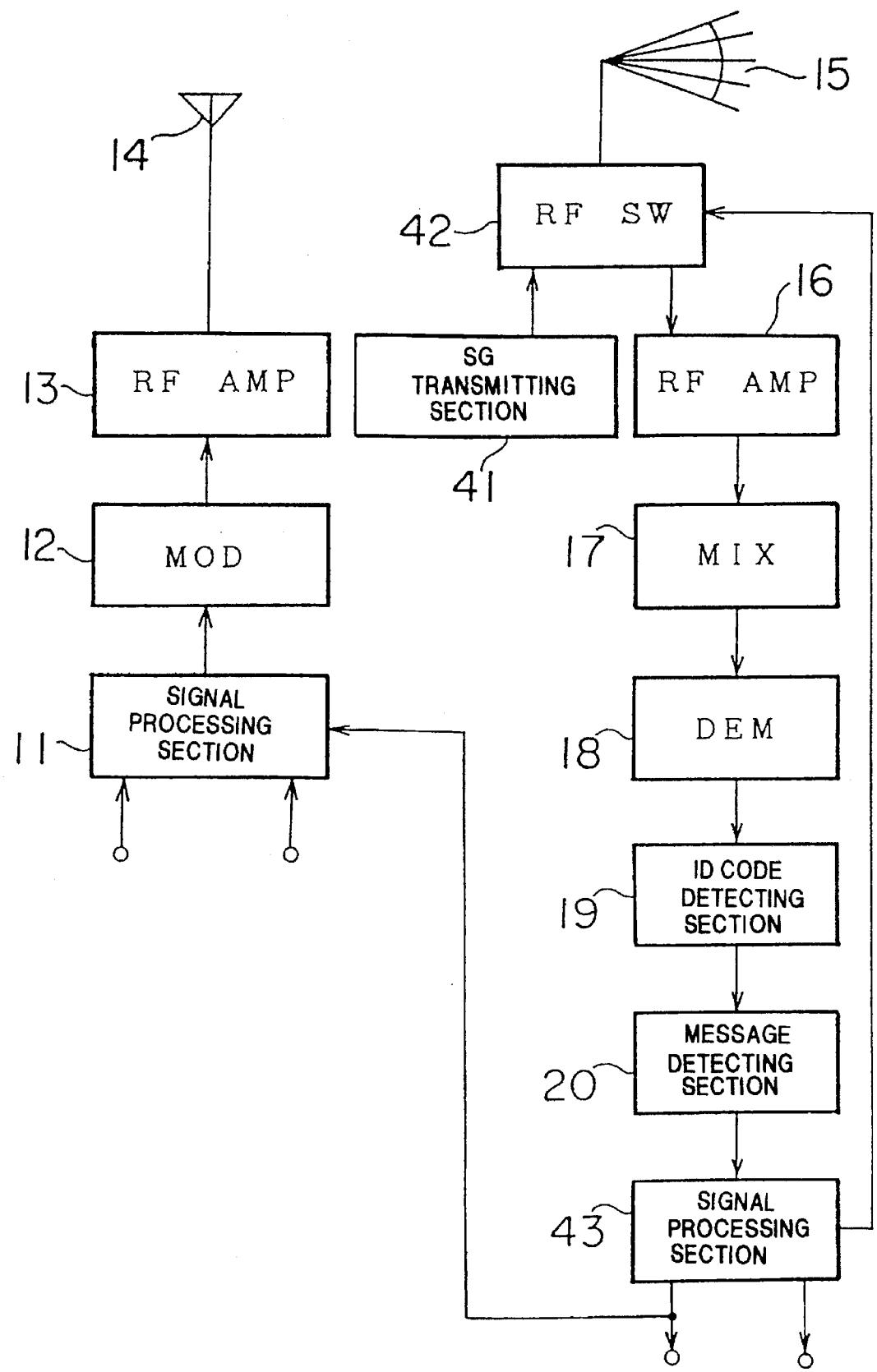
FIG. 6 is a block diagram of a base station of a second embodiment.

FIG. 6 is a block diagram of the base station of the second embodiment. Since the configuration of the base station of the second embodiment is basically the same as that of the first embodiment, like reference numerals are applied to essentially the same sections and elements, and the description of these sections and elements is omitted. Only the different sections and elements will be described.

Figure 8:
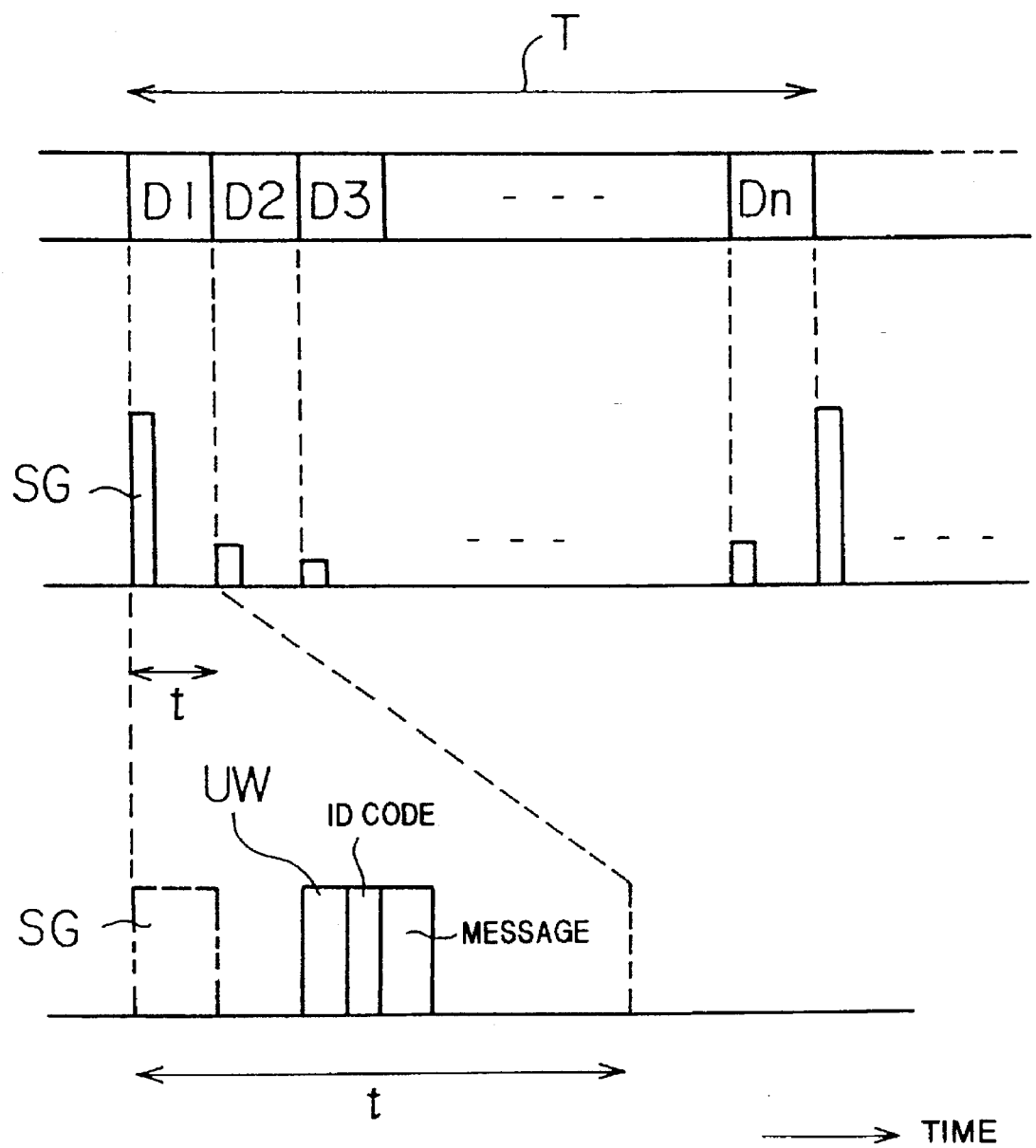
FIG. 8 is a view showing non-modulated timing signals.

An SG transmitting section 41 generates a non-modulated timing signal SG in synchronization with the direction control of the directivity of a scanning antenna 15. Specifically, as shown in FIG. 8, the scanning period T of the directivity of the scanning antenna 15 is divided into n, and the scanning of the scanning antenna 15 is controlled so that the directivity direction of the scanning antenna 15 consists of divided directions D1 to Dn. At the first of the period when the directivity of the scanning antenna 15 is directed to each of the directions D1 to Dn, the timing signal SG is generated by the SG transmitting section 41 and outputted to an RF switching section 42. The timing signal SG has a frequency which slightly deviates from the frequency of the modulated carrier from a modulating section 12, so-called a leak frequency.

The configuration of a signal processing section 43 is basically the same as that of the signal processing section 21 of the first embodiment. However, the signal processing section 43 outputs a transmission switching signal to the RF switching section 42 when the timing signal SG is outputted from the SG transmitting section 41.

The RF switching section 42 is normally located on the reception side. However, it is located on the transmission side only when the transmission switching signal is sent from the signal processing section 43, so that the non-modulated timing signal SG is sent from the scanning antenna 15.

Figure 7:
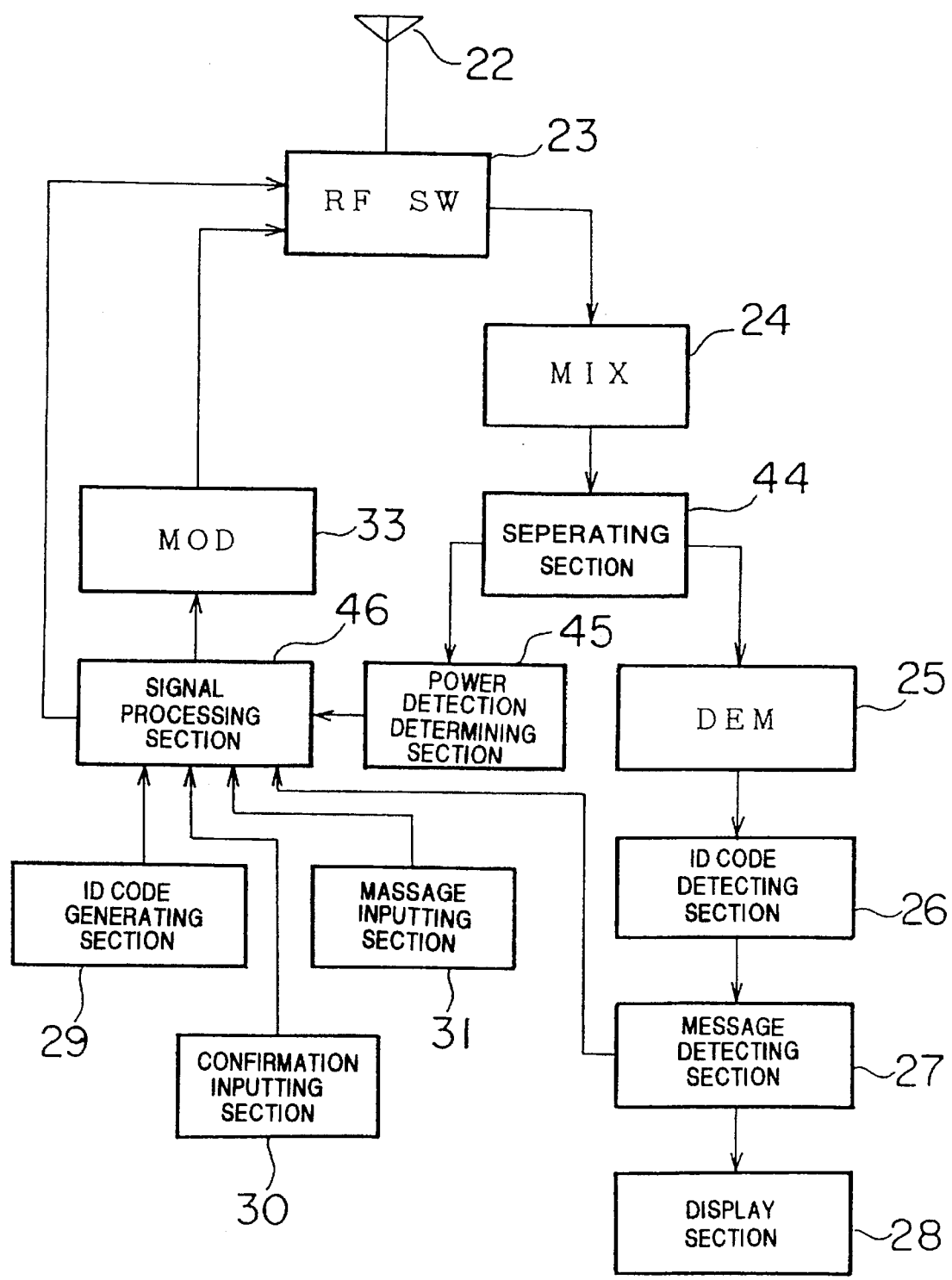
FIG. 7 is a block diagram of a pager of a second embodiment.

FIG. 7 is a block diagram of a pager of the second embodiment. Since the configuration of the pager of the second embodiment is basically the same as that of the first embodiment, like reference numerals are applied to essentially the same sections and elements, and the description of these sections and elements is omitted. Only the different sections and elements will be described.

A separating section 44 is a filter for separating the modulated carrier sent from the modulating section 12 from the timing signal SG sent from the SG transmitting section 41 on the basis of the difference in frequency. This section sends the timing signal SG to a power detection determining section 45. The power detection determining section 45 detects the power value of the sent timing signal SG, compares it with a predetermined level, and sends a high power SG detection signal to a signal processing section 46 when the detected power value is above a predetermined level. That is to say, when the pager of the second embodiment is located in the directivity direction D1 of the scanning antenna, the power detection determining section 45 detects the timing signal SG of high power in the direction D1, as shown in FIG. 8, and does not detect the timing signal SG of high power in other directions D2 to Dn.

At the signal processing section 46, when a confirmation signal is inputted from a confirmation inputting section 30, the message sent from a message inputting section 31 is added to the self station ID code signal sent from an ID code generating section 29, and a unique word (UW) is further added to the self station ID code signal, to output the signal to a modulating section 33. The output timing is, as shown in FIG. 8, in the period of directivity direction of the scanning antenna 15 provided when a high power SG detection signal is sent from the power detection determining section 45. When the pager is located in the directivity direction D1 of the scanning antenna 15, the signal is outputted in the period t of the directivity direction D1. The signal processing section 46 executes this output repeatedly each time the directivity direction of the scanning antenna 15 rotates one turn. Upon receipt of an answer back signal from the message detecting section 27, the signal processing section 46 stops the repeated execution of this output. Incidentally, the signal processing section 46 outputs a transmission switching signal to the RF switching section 23 when an output signal is outputted to the modulating section 33.

In the second embodiment, the power detection determining section 45 of the pager receives the timing signal SG for each of divided directions D1 to Dn, which is transmitted from the SG transmitting section 41 of the base station via the scanning antenna 15, and determines the reception level. When the reception level is high, the pager can find that the directivity direction of the scanning antenna 15 faces the pager. Therefore, the signal processing section 46 of the pager is operated so that the transmission from the pager to the base station is performed only when the directivity direction of the scanning antenna 15 faces the pager. This eliminates wasteful transmission from the pager to the base station, resulting in further decrease in power consumption. Specifically, the power consumption is reduced to 1/n as compared with the first embodiment since the directivity direction of the scanning antenna 15 is divided into directions D1 to Dn.

Figure 9:
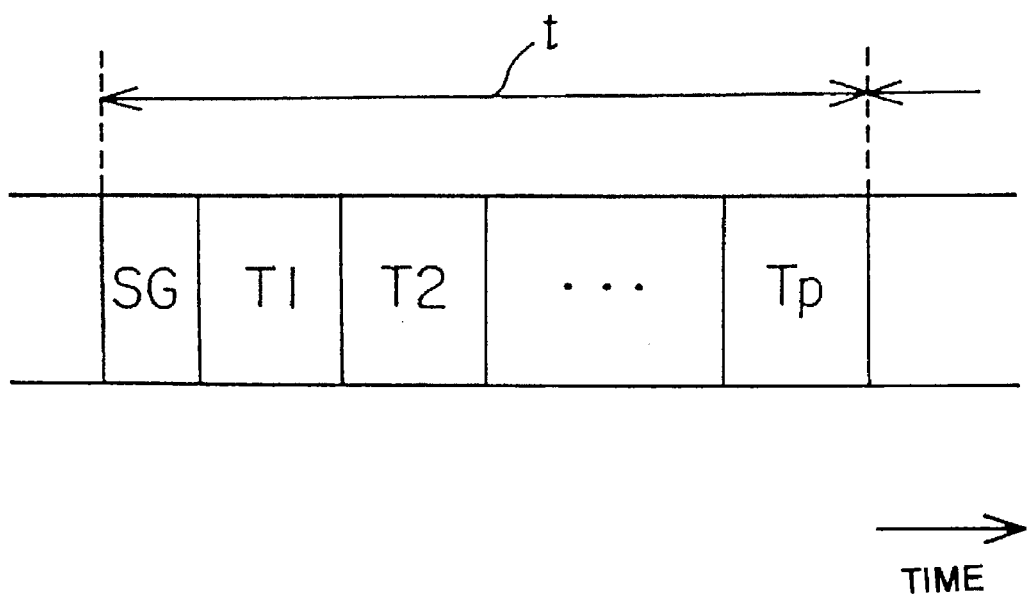
FIG. 9 is a view showing the timing of transmission from a pager.

In the second embodiment, the self station ID code signal, the message, and the unique word are outputted from the signal processing section 46 to the modulating section 33 at random in the period t of the directivity direction of the scanning antenna 15 provided when a high power SG detection signal is sent from the power detection determining section 45 as shown in FIG. 8. Instead, as shown in FIG. 9, the period t is divided into T1 to Tp in advance except for the input period of the timing signal SG so that the transmission from the pager can be performed in any one slot selected from the slots T1 to Tp.

Figure 10:
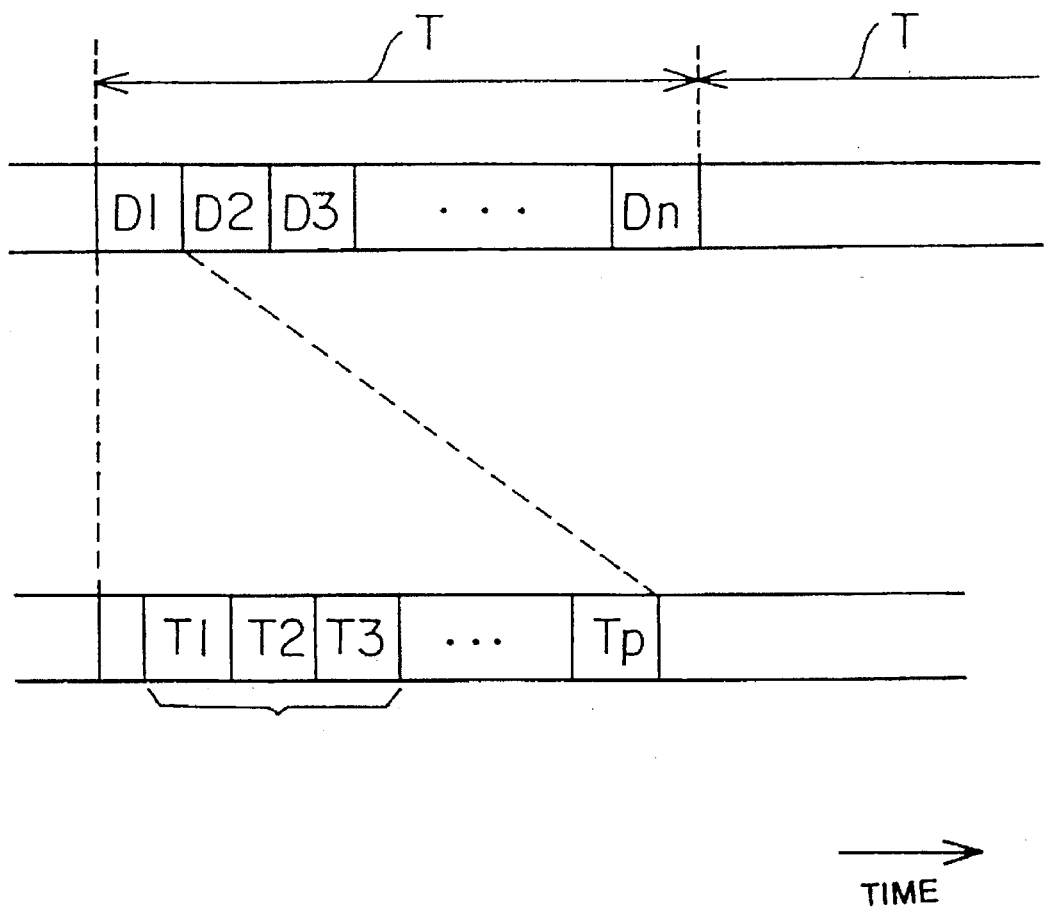
FIG. 10 is a view for illustrating the allocation of transmission from a pager.

Further, as shown in FIG. 10, among the slots T1 to Tp to which the transmission from a pager in each of divided directions D1 to Dn of the directivity of the scanning antenna 15 is inserted, only specific slots T1 to T3 may be allocated to a special pager so that the special pager can preferentially send signals to the base station.

Figure 11:
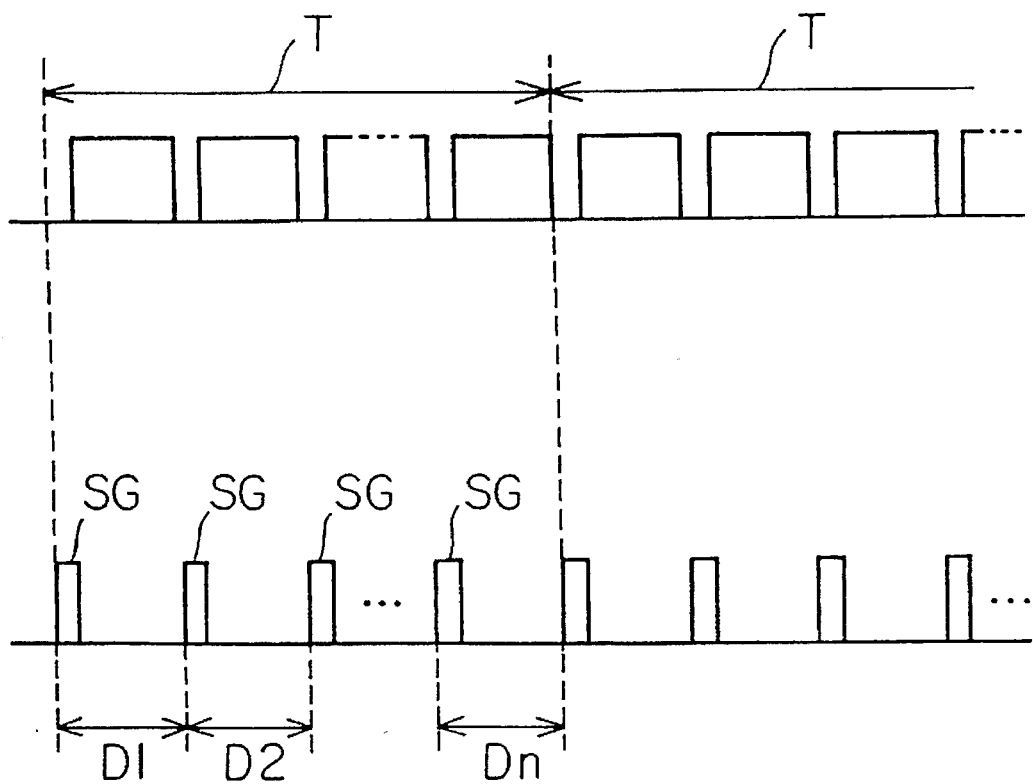
FIG. 11 is a view showing the transmission timing of base station.

Also, in the second embodiment, there is no limitation of the transmission timing of the signal transmitted from an omnidirectional antenna 14 of the base station. Instead, as shown in FIG. 11, signals may be transmitted from the omnidirectional antenna 14 only in the period when the timing signal SG is not outputted from the scanning antenna 15. This allows the same frequency to be used for the transmission from the omnidirectional antenna 14 and the transmission from the scanning antenna 15.

Next, a third embodiment of the present invention will be described.

Figure 12:
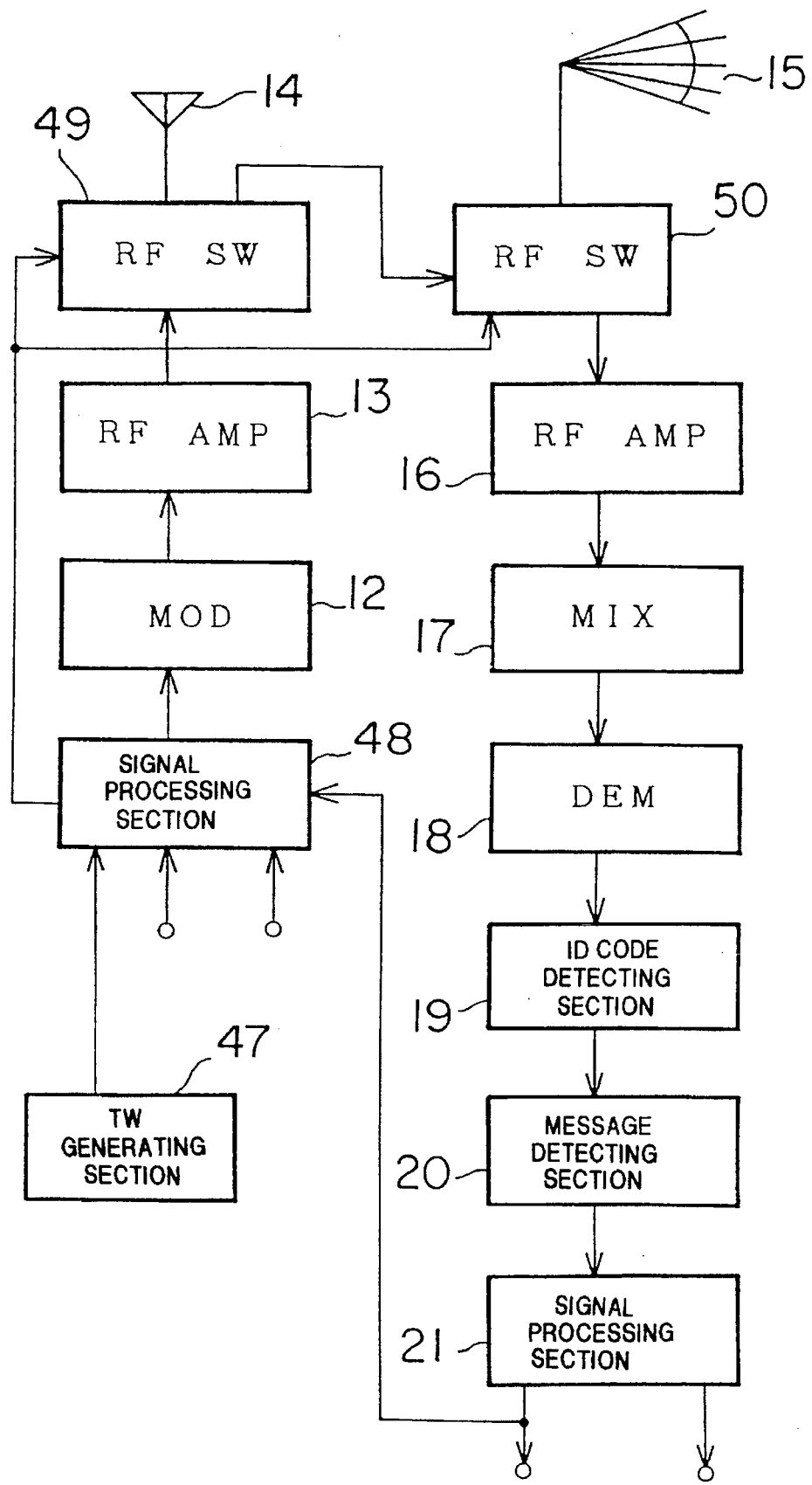
FIG. 12 is a block diagram of a base station of a third embodiment.

FIG. 12 is a block diagram of a base station of the third embodiment. Since the configuration of the base station of the third embodiment is basically the same as that of the first embodiment, like reference numerals are applied to essentially the same sections and elements, and the description of these sections and elements is omitted. Only the different sections and elements will be described.

A TW generating section 47 generates a timing word (TW) consisting of a predetermined code. The timing word is generated in the foremost interval to of the time interval t for each of the directivity directions D1 to Dn of the scanning antenna 15. A signal processing section 48 synthesizes the ID code signal, the message signal, and the unique word signal, and sends the signals to the modulating section 12 in the remaining time interval (t–t0) of the aforementioned interval t0. It also sends a timing word from the TW generating section 47 to the modulating section 12 in the time interval t0. Further, the signal processing section 48 sends a TW switching signal to an RF switching section 49 and an RF switching section 50 in the aforementioned time interval t0.

The RF switching section 49 sends the modulated waves of the synthesized signal of the ID code signal, the message signal, and the unique word signal to the omnidirectional antenna 14 when the TW switching signal is not inputted, and sends the modulated waves of the timing word to the RF switching section 50 when the TW switching signal is inputted. Both of these modulated waves are modulated by the same modulation system. The RF switching section 50 is positioned on the reception side when the TW switching signal is not inputted, and it is positioned on the transmission side when the TW switching signal is inputted in order to send the modulated waves of timing word to the scanning antenna 15.

Figure 13:
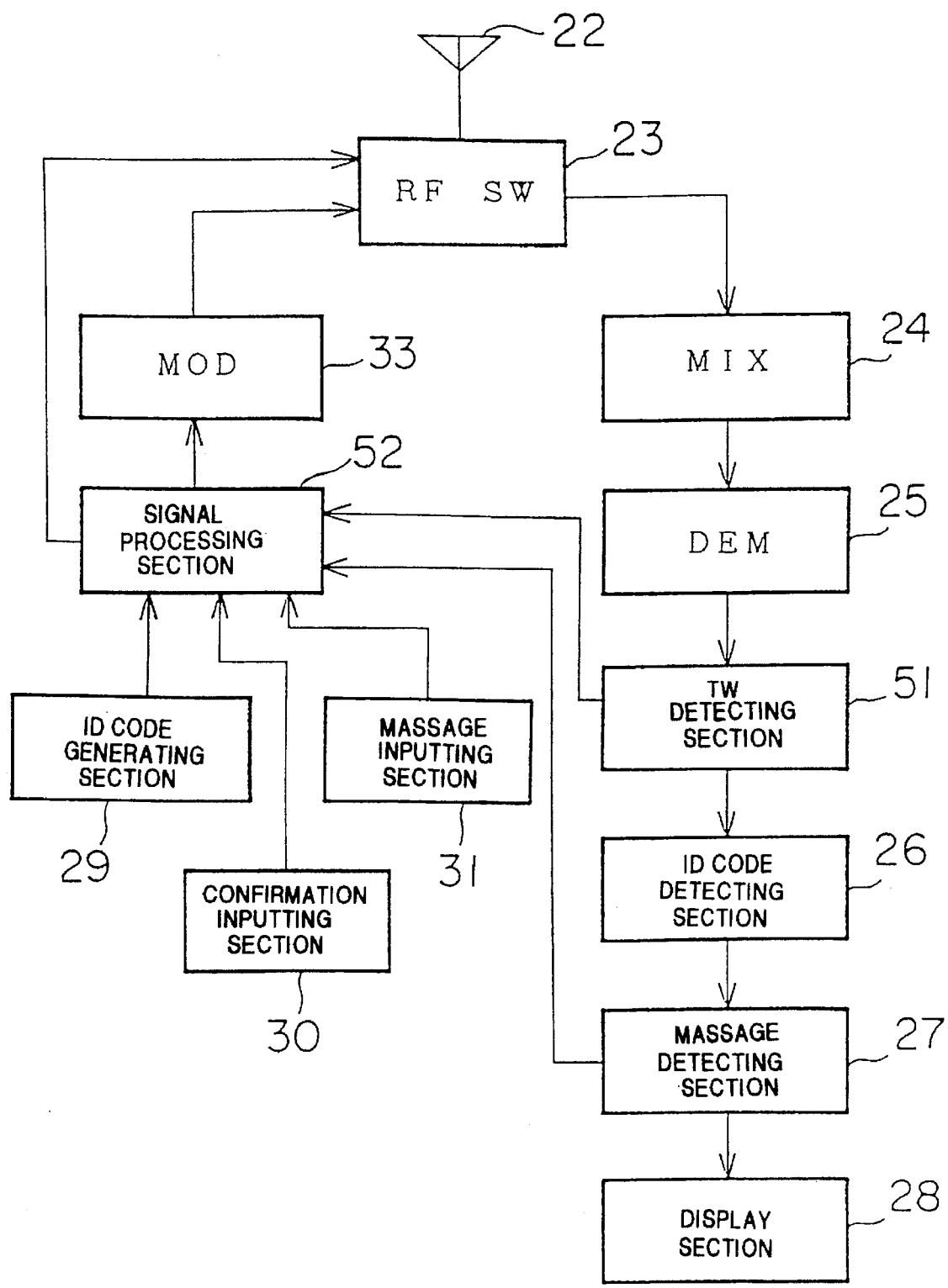
FIG. 13 is a block diagram of a pager of a third embodiment.

FIG. 13 is a block diagram of a pager of the third embodiment. Since the configuration of the pager of the third embodiment is basically the same as that of the first embodiment, like reference numerals are applied to essentially the same sections and elements, and the description of these sections and elements is omitted. Only the different sections and elements will be described.

Figure 14:
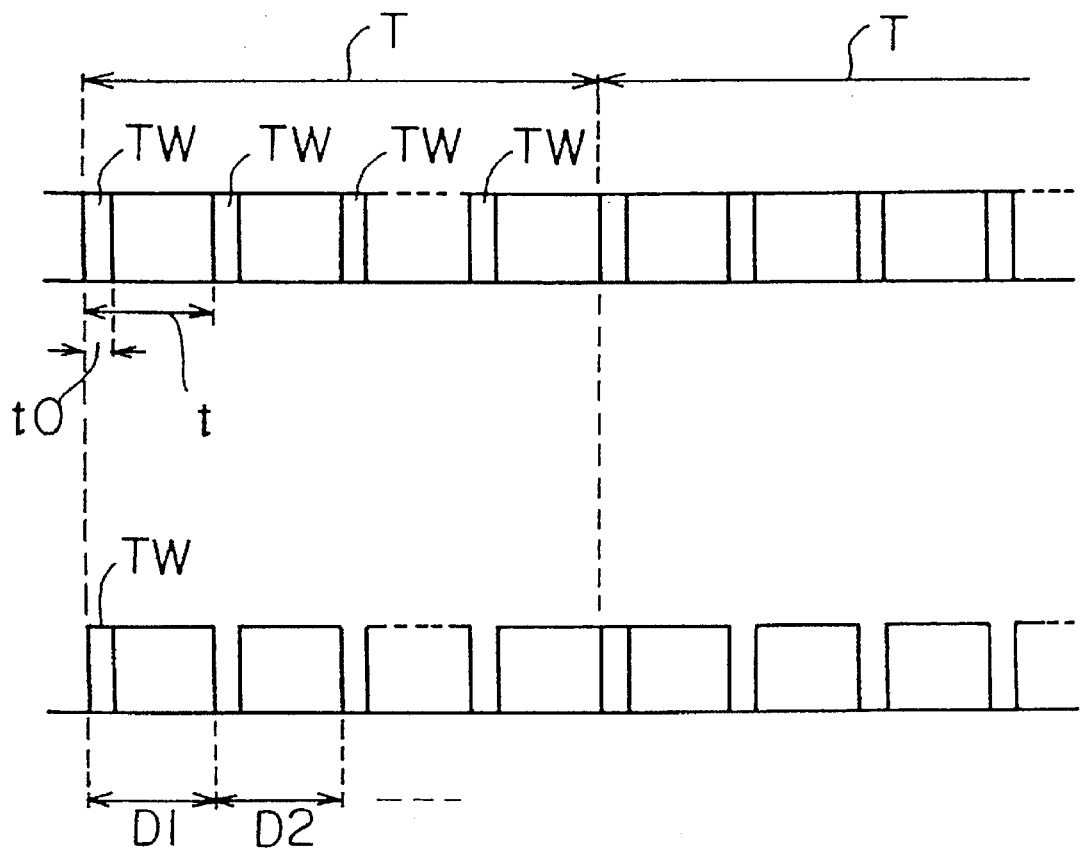
FIG. 14 is a view showing the transmission/reception of timing word.

A TW detecting section 51 performs monitoring to check whether a timing word is included in the demodulated signals, and outputs the TW detection signal to a signal detecting section 52 when detecting the timing word. Specifically, when the directivity direction of the scanning antenna 15 shown in FIG. 12 faces the position of the pager shown in FIG. 13, a timing word of high level can be detected only in the direction D1 as shown at the lower part of FIG. 14 if the directivity direction of the scanning antenna 15 is D1. Since the timing word sent from the scanning antenna 15 is transmitted by being modulated by the modulation system that is the same as that for the signal sent from the omnidirectional antenna 14, the RF amplifying section 16, the converting section 17, and the demodulating section 18 of the pager can be used also for the reception of the timing word, and C/N is improved as compared with the non-modulated timing signal SG of the second embodiment because the timing word is modulated and sent.

At the signal processing section 52, when a confirmation signal is inputted from the confirmation inputting section 30, the message sent from the message inputting section 31 is added to the self station ID code signal sent from the ID code generating section 29, and a unique word (UW) is further added to the self station ID code signal, to output the signal to the modulating section 33. The output timing is in the period of directivity direction of the scanning antenna 15 provided when a TW detection signal is sent from the TW detecting section 51. The signal processing section 52 executes this output repeatedly each time the directivity direction of the scanning antenna 15 rotates one turn. Upon receipt of an answer back signal from the message detecting section 27, the signal processing section 52 stops the repeated execution of this output. Incidentally, the signal processing section 52 outputs a transmission switching signal to the RF switching section 23 when an output signal is outputted to the modulating section 33.

In the third embodiment, the modulated signal of timing word for each of the divided directions D1 to Dn, which is transmitted from the TW generating section 47 of the base station via the scanning antenna 15, is received and demodulated by the pager, so that the timing word is detected by the TW detecting section 51. This detection is made in the condition where C/N is satisfactory; therefore, the timing word is detected accurately. By this detection, the pager can find that the directivity direction of the scanning antenna 15 faces the pager. Therefore, the signal processing section 52 of the pager is operated so that the transmission from the pager to the base station is performed only when the directivity direction of the scanning antenna 15 faces the pager. This eliminates wasteful transmission from the pager to the base station. resulting in further decrease in power consumption.

In the second and third embodiments, the time widths of divided directions D1 to Dn of the directivity of the scanning antenna 15 are equal. Instead, the amount of communication (for example, the number of answer back signals) from the pager located in the divided directions D1 to Dn at the base station is measured, and the time widths of the divided directions D1 to Dn may be increased in proportion to the amount of communication. This accommodates the concentration of pagers in a specific divided direction and enhances the transmission efficiency.

Next, a fourth embodiment of the present invention will be described. The base station of the fourth embodiment has the same configuration as the base station of the first embodiment. Therefore, the description of the base station is omitted.

Figure 15:
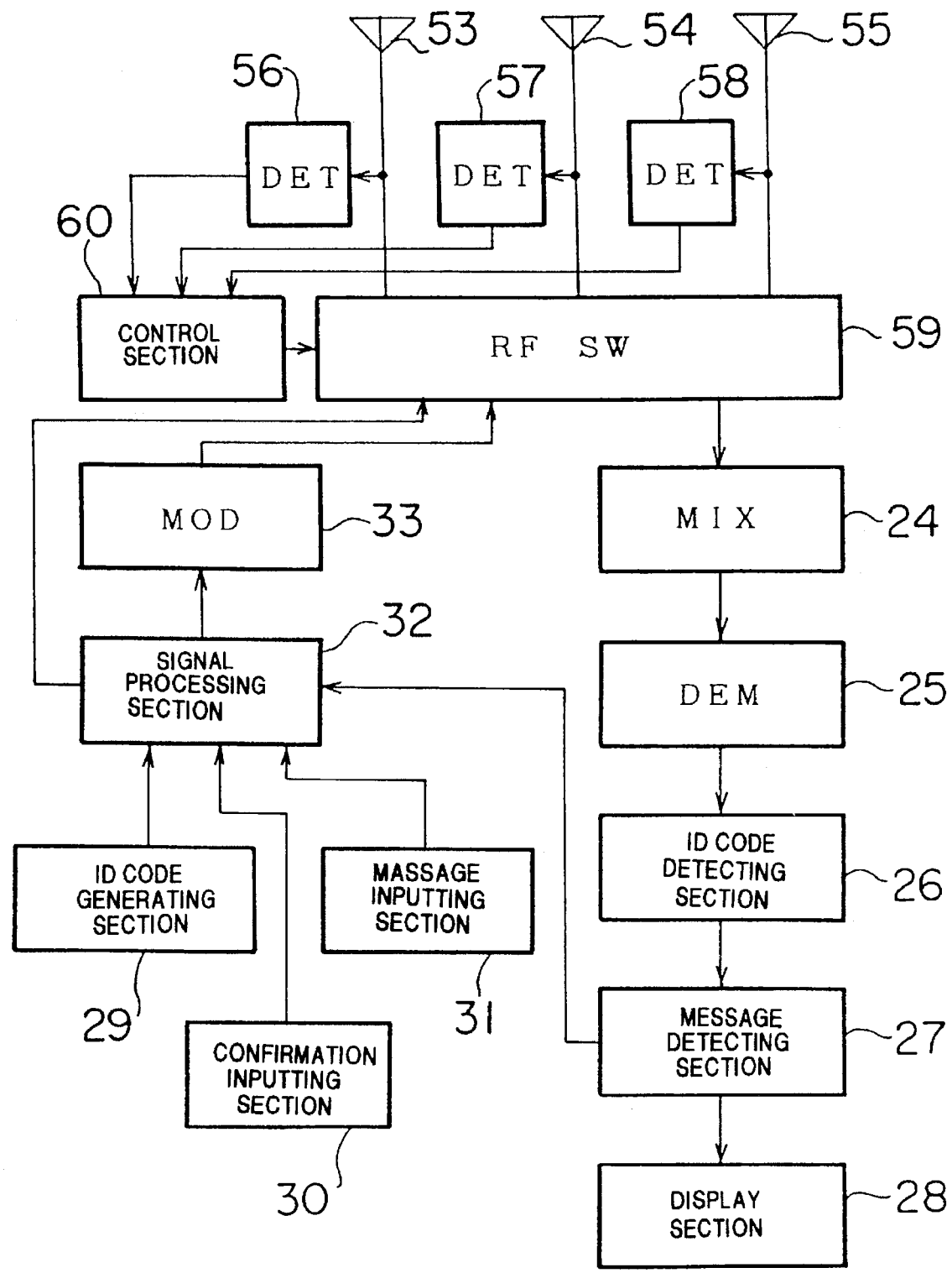
FIG. 15 is a block diagram of a pager of a fourth embodiment.

FIG. 15 is a block diagram for a pager of the fourth embodiment. Since the configuration of the pager of the fourth embodiment is basically the same as that of the first embodiment, like reference numerals are applied to essentially the same sections and elements, and the description of these sections and elements is omitted. Only the different sections and elements will be described.

The pager of the fourth embodiment has, for example, three antennas 53 to 55, and an RF switching section 59 for selecting one antenna from these antennas 53 to 55. Power detecting sections 56 to 58 are connected to the antennas 53 to 55, respectively, to detect the reception power of the signal inputted from the antenna. The detected reception power is inputted to a control section 60. The control section 60 compares the powers, selects the antenna which has sent the highest reception power, and outputs the selected signal to an RF switching section 59. The RF switching section 59 outputs the reception signal from the antenna specified by the selected signal to converting section 24, and outputs the modulated signal from the modulating section 33 to the aforementioned specified antenna according to the transmission switching signal from the signal processing section 32.

Thus, the reception sensitivity is enhanced by selecting an antenna with high reception power, and the communication quality is improved by using that antenna to transmit signals.

The antennas 53 to 55 of the fourth embodiment may have respective directivity.

Next, a fifth embodiment of the present invention will be described. The base station of the fifth embodiment has the same configuration as the base station of the first embodiment. Therefore, the description of the base station is omitted.

Figure 16:
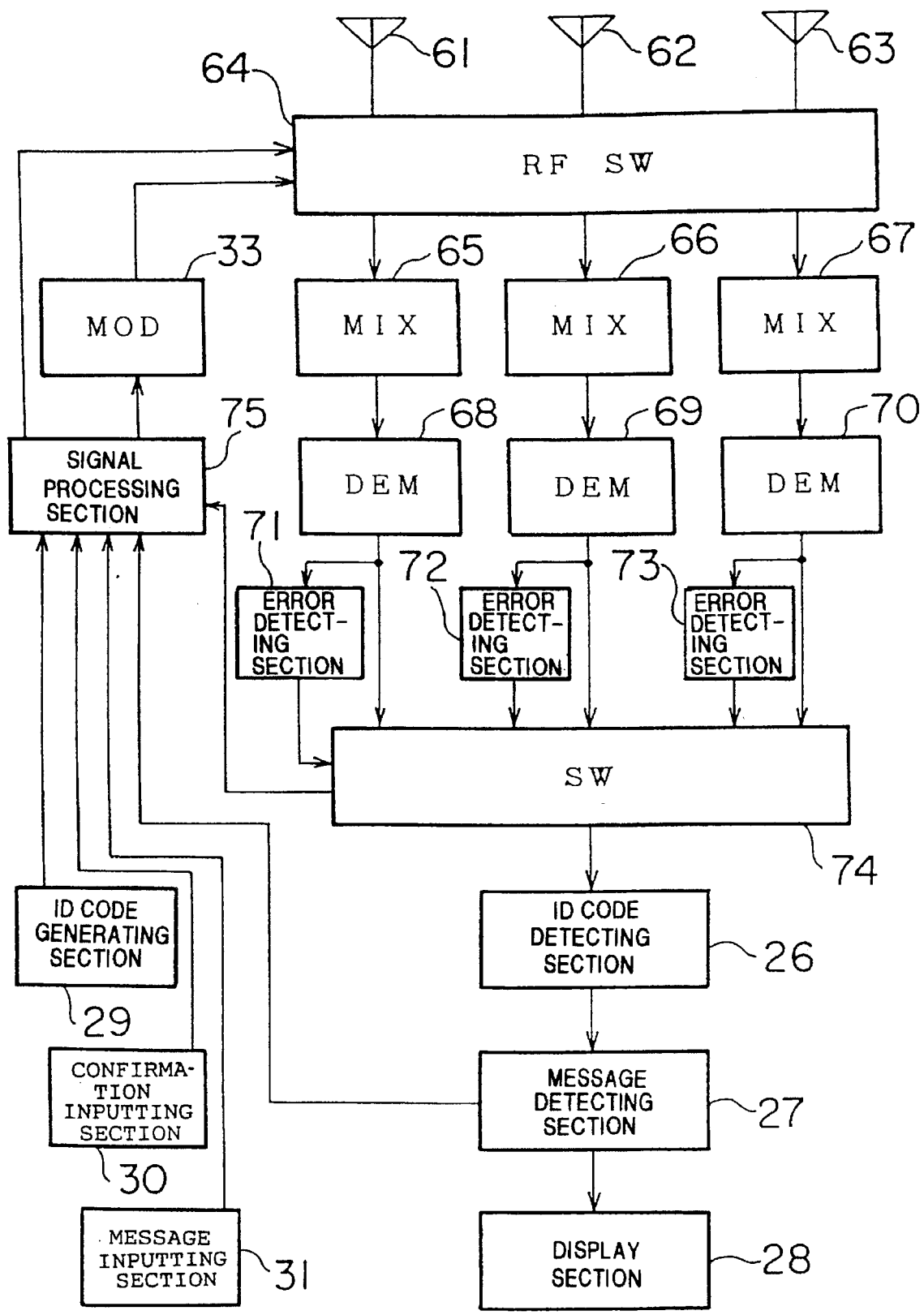
FIG. 16 is a block diagram of a pager of a fifth embodiment.

FIG. 16 is a block diagram of a pager of the fifth embodiment. Since the configuration of the pager of the fifth embodiment is basically the same as that of the first embodiment, like reference numerals are applied to essentially the same sections and elements, and the description of these sections and elements is omitted. Only the different sections and elements will be described.

The pager of the fifth embodiment has, for example, three antennas 61 to 63, converting sections 65 to 67 for converting the reception signal of the respective antennas 61 to 63 into IF signals respectively, and demodulating sections 68 to 70 for FSK demodulating respective IF signals. An RF switching section 64 connects the antenna to the respective converting section as long as it does not receive a transmission switching signal. Error detecting sections 71 to 73 detect the code error rate respectively on the basis of the FSK demodulation signals outputted from the demodulators 68 to 70, and output it to a switching section 74. The switching section 74 compares the code error rates sent from the error detecting sections 71 to 73, selects the best FSK demodulation signal, and outputs it to an ID code detecting section 26. The switching section 74 tells the reception system which has outputted the selected FSK demodulation signal to a signal processing section 75.

The configuration of the signal processing section 75 is basically the same as that of the signal processing section 32 of the first embodiment. However, when the transmission switching signal is sent to the RF switching section 64, the reception system told by the switching section 74 is also told to the RF switching section 64. Upon receipt of a transmission switching signal, the RF switching section 64 performs switching so that transmission is accomplished from the antenna of the reception system told at the same time.

Thus, the communication quality can be enhanced.

Next, a sixth embodiment of the present invention will be described.

Figure 17:
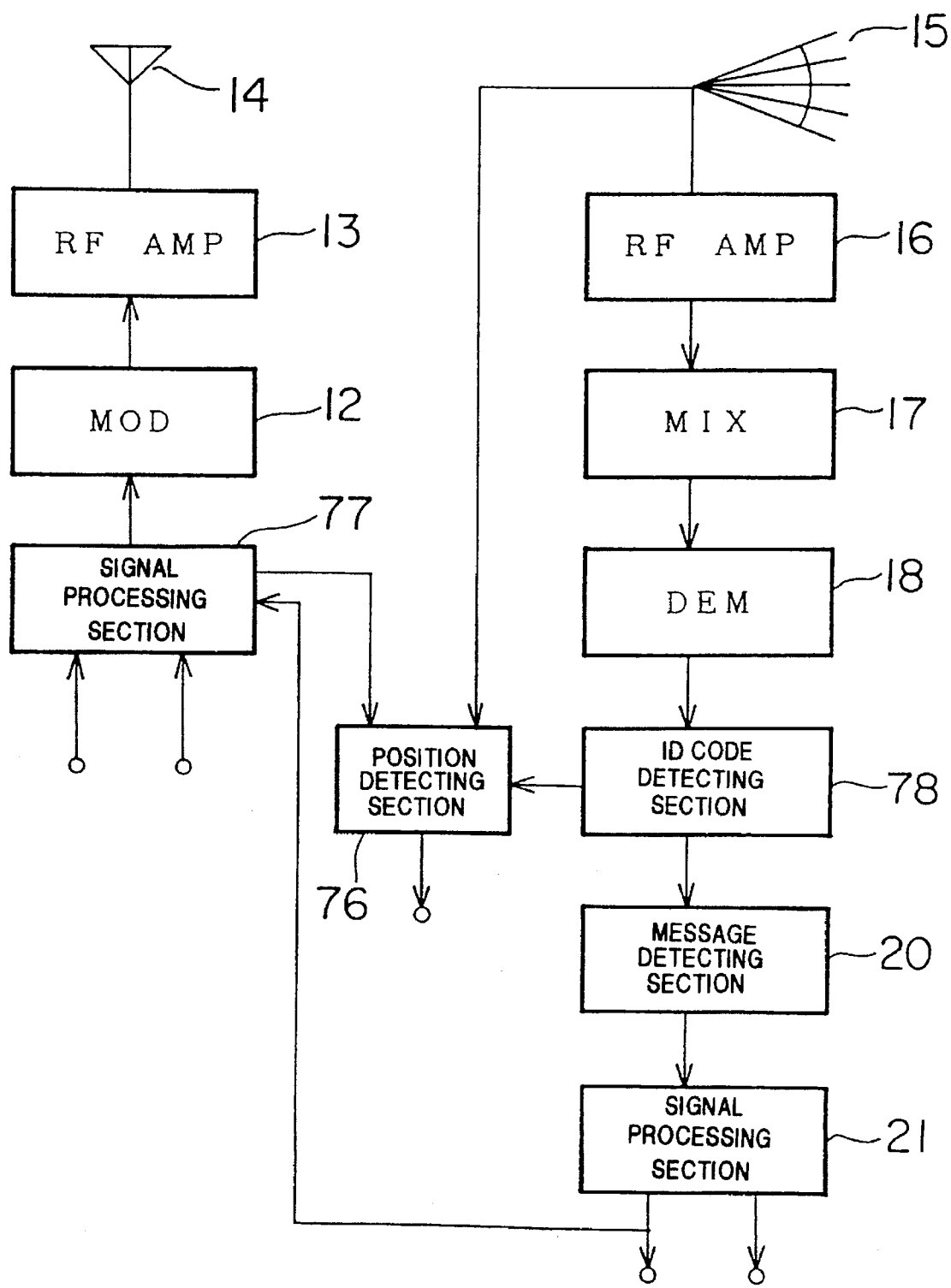
FIG. 17 is a block diagram of a base station of a sixth embodiment.

FIG. 17 is a block diagram of a base station of the sixth embodiment. Since the configuration of the base station of the sixth embodiment is basically the same as that of the first embodiment, like reference numerals are applied to essentially the same sections and elements, and the description of these sections and elements is omitted. Only the different sections and elements will be described.

A signal processing section 77 synthesizes the ID code signal, the message signal, and the unique word signal, and outputs the signals to the modulating section 12. The output is performed in synchronization with the divided direction of the directivity of the scanning antenna 15. Specifically, as shown in FIGS. 19(A) to 19(C), for example, the ID code ID1, the message M1, etc. are positioned in the slot T1 composing the divided direction D1 of the directivity of the scanning antenna 15, and outputted to the modulating section 12. The signal processing section 77 outputs the output timing signal indicative of the output timing to a position detecting section 76. Here, the description of an ID code detecting section 78 and the position detecting section 76 is left over, and the explanation of FIG. 18 will be made now.

Figure 18:
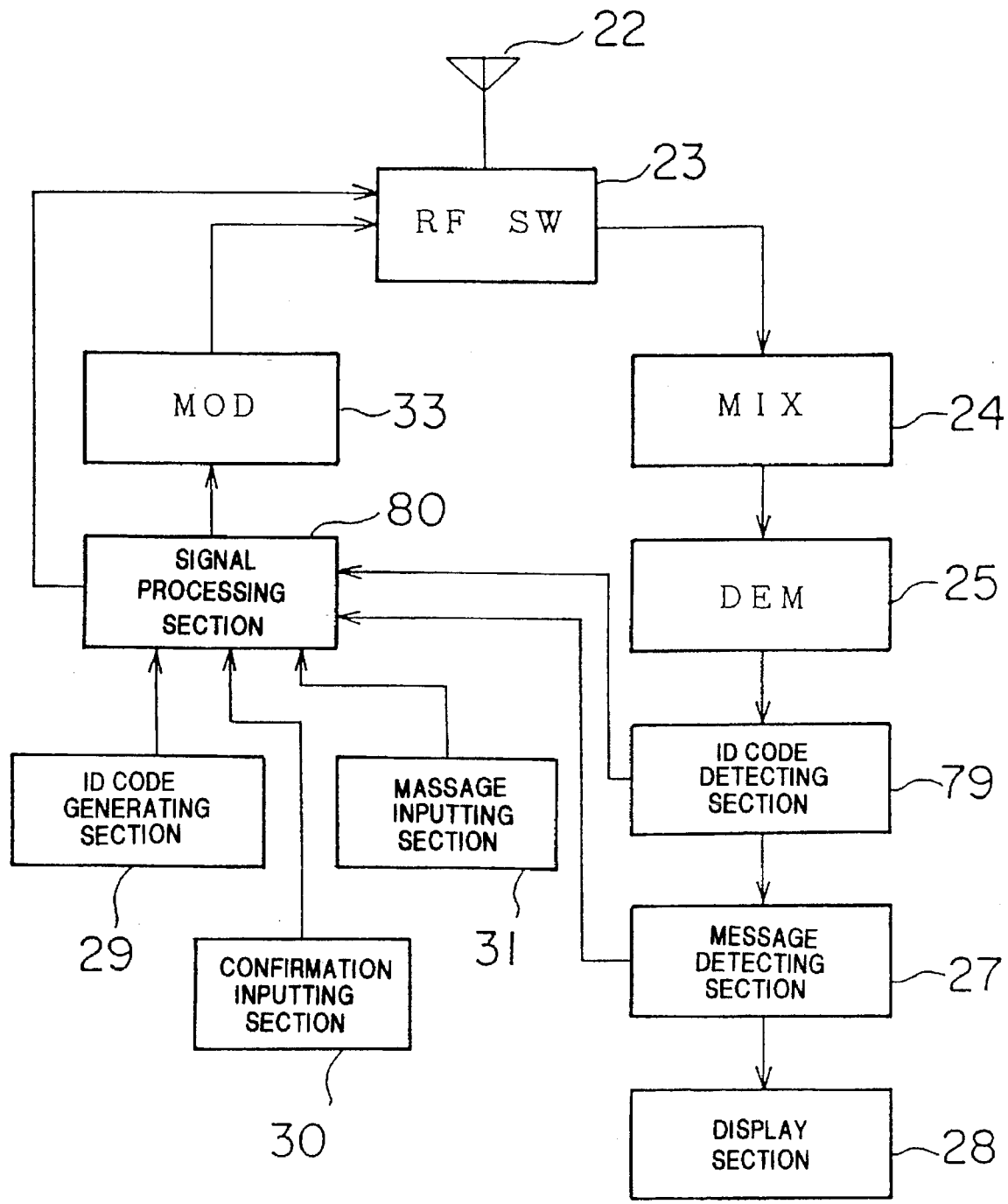
FIG. 18 is a block diagram of a pager of a sixth embodiment.
Figure 19:
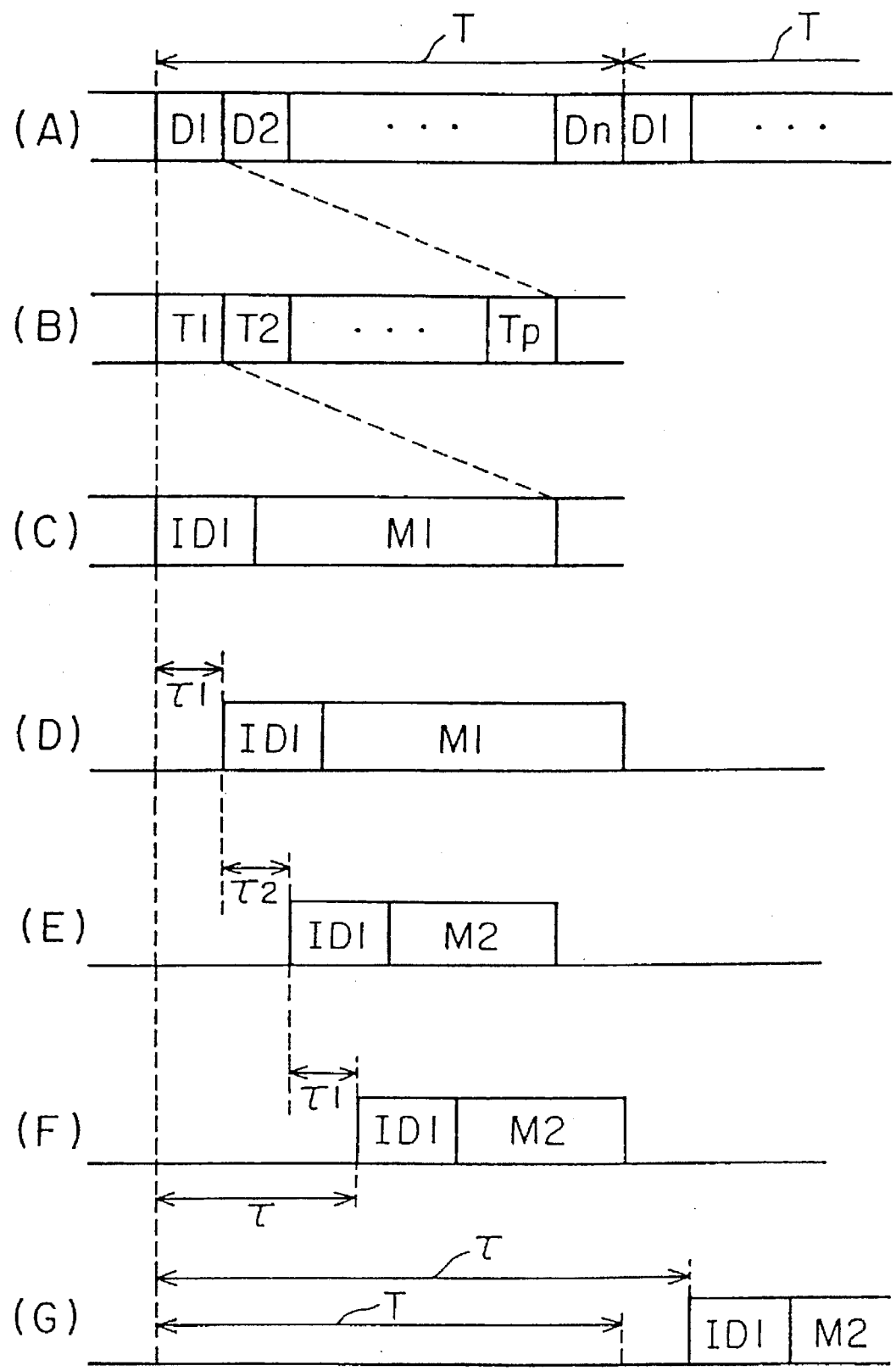
FIG. 19 is a view showing the transmission/reception timing of a base station.

FIG. 18 is a block diagram of a pager of the sixth embodiment. Since the configuration of the pager of the sixth embodiment is basically the same as that of the first embodiment, like reference numerals are applied to essentially the same sections and elements, and the description of these sections and elements is omitted. Only the different sections and elements will be described.

The configuration of an ID code detecting section 79 is basically the same as that of the ID code detecting section 26 of the first embodiment. However, the ID code detecting section 79 outputs the ID detection signal to a signal processing section 80 as soon as the self station ID code is detected. Specifically, as shown in FIG. 19(D), after a propagation time τ1 from the base station to the pager has elapsed, the ID code detecting section 79 detects the self station ID code, and outputs the ID code detection signal to the signal processing section 80.

The configuration of the signal processing section 80 is basically the same as that of the signal processing section 32 of the first embodiment. However, the signal processing section 80 does not output signals until the ID code detection signal is received from the ID code detecting section 79 even if a confirmation signal is inputted from a confirmation inputting section 30. The signal processing section 80 outputs signals immediately after receiving the ID detection signal. Thereby, as shown in FIG. 19(E), the ID code ID1, the message M1, etc. are transmitted from the pager after an inside processing time τ2 has elapsed.

Referring back to FIG. 17, the configuration of the ID code detecting section 78 is basically the same as that of the ID code detecting section 19 of the first embodiment. However, the ID code detecting section 78 outputs the output timing signal indicative of the output timing to the position detecting section 76 when the ID code is detected. Specifically, as shown in FIG. 19(F), after a propagation time τ1 from the pager to the base station has elapsed, the ID code detecting section 78 detects the ID code, and outputs the output timing signal to the position detecting section 76.

To the position detecting section 76 is inputted the data on the directivity direction of the scanning antenna 15 as well as the output timing signal from the signal processing section 77 and the output timing signal from the ID code detecting section 78. The position detecting section 76 calculates the distance from the base station to the pager by subtracting the processing time τ2 from the input time difference τ between the output timing signal from the signal processing section 77 and the output timing signal from the ID code detecting section 78, dividing the result by 2, and multiplying the result by the light velocity C [(τ−τ2)/2·C], and further, calculates and outputs the spatial position of the pager by using the data on the directivity direction of the scanning antenna 15. The data on the spatial position of the pager is used for the service to call requesters.

As shown in FIG. 19(G), the chance of transmission from the pager to the base station is present for each period T of the scanning antenna. Therefore, the above distance can be calculated by subtracting an appropriate multiple of the period T from the input time difference τ.

Next a seventh embodiment of the present invention will be described. The seventh embodiment relates to the case where a plurality of base stations are installed and a control center for controlling these plural base stations is present.

Figure 20:
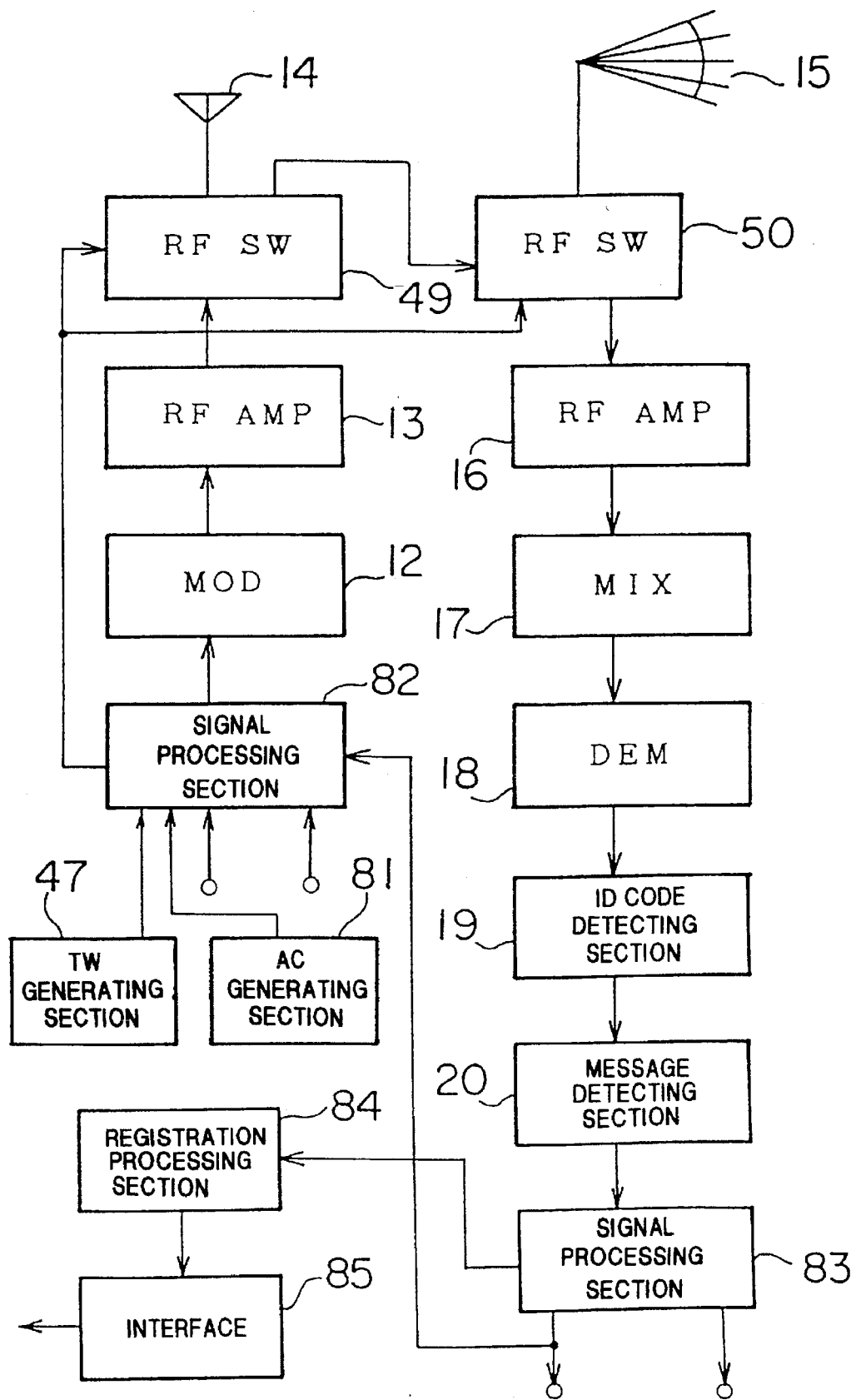
FIG. 20 is a block diagram of a base station of a seventh embodiment.

FIG. 20 is a block diagram of one base station of the plural base stations of the seventh embodiment. All base stations have the same configuration. Since the configuration of the base station of the seventh embodiment is basically the same as that of the third embodiment, like reference numerals are applied to essentially the same sections and elements, and the description of these sections and elements is omitted. Only the different sections and elements will be described.

An AC generating section 81 generates an antenna code (AC) consisting of a predetermined code. This antenna code is the code peculiar to a scanning antenna 15. A signal processing section 82 synthesizes the antenna code sent from the AC generating section 81 to the ID code signal, the message signal, and the unique word signal, and sends it to the modulating section 12. Here, the description of a signal processing section 83, a registration processing section 84, and an interface 85 is left over, and the explanation of FIG. 21 will be made now.

Figure 21:
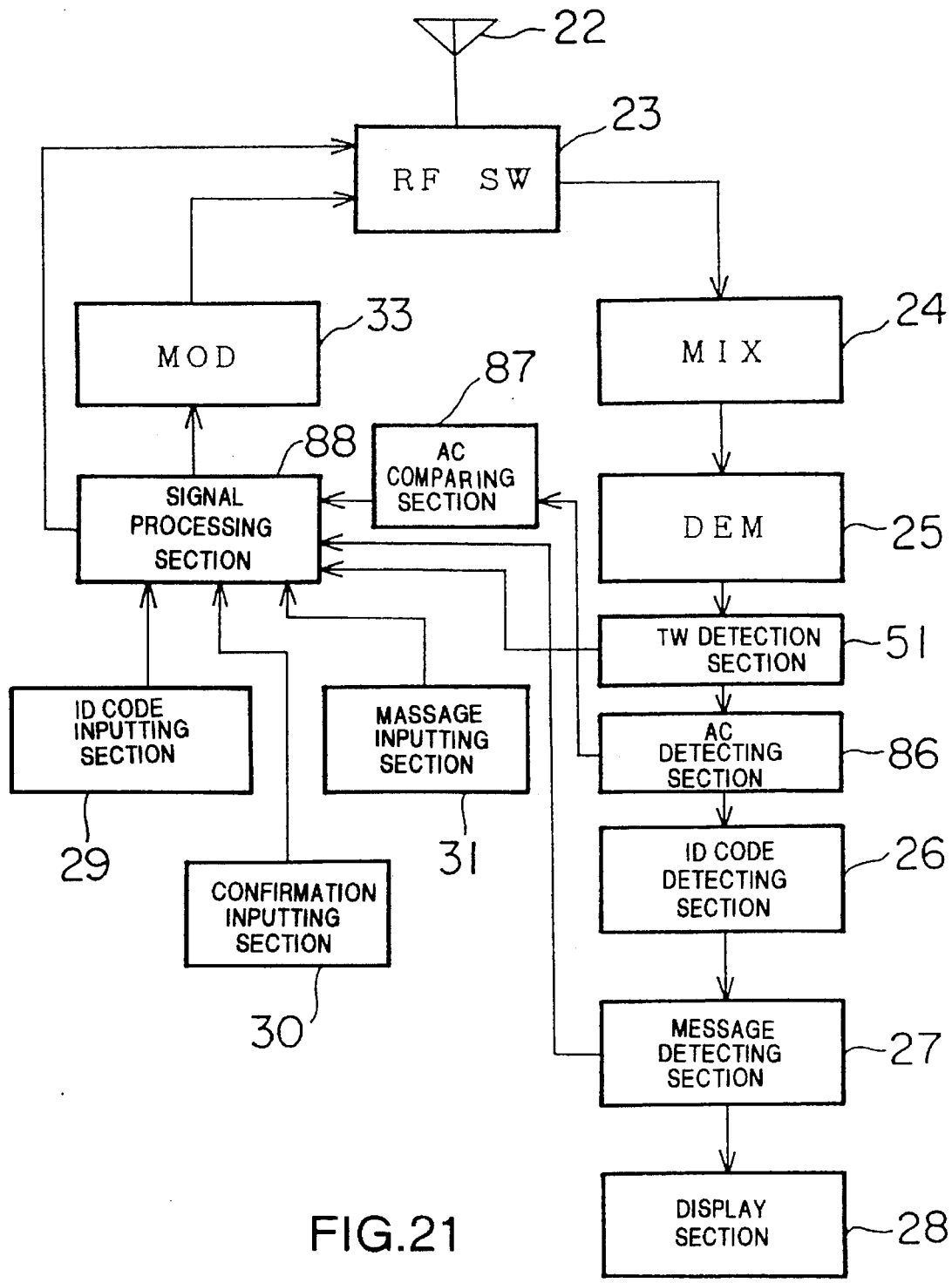
FIG. 21 is a block diagram of a pager of a seventh embodiment.

FIG. 21 is a block diagram of a pager of the seventh embodiment. Since the configuration of the pager of the seventh embodiment is basically the same as that of the third embodiment, like reference numerals are applied to essentially the same sections and elements, and the description of these sections and elements is omitted. Only the different sections and elements will be described.

An AC detecting section 86 detects an antenna code included in the demodulation signal, and outputs it to an AC comparing section 87. The AC comparing section 87 stores the antenna code sent from the AC detecting section 86, and compares the newly sent antenna code with the stored antenna code. Only when difference is found, the newly sent antenna code is outputted to a signal processing section 88. The case where the antenna code is different means that the pager moves and receives signals from a scanning antenna different from the previous scanning antenna.

The configuration of the signal processing section 88 is basically the same as that of the signal processing section 52 of the third embodiment. However, the new antenna code, which is sent from the AC comparing section 87, is added to the ID code, the message, etc., and sent to a modulating section 33.

Referring back to FIG. 20, when an antenna code is included in the demodulation signal, the signal processing section 83 outputs the antenna code to the registration processing section 84. The registration processing section 84 sends the ID code to which the antenna code is added, together with the antenna code, to a control center (not shown) via the interface 85, and registers the service zone of the base station (actually, the scanning antenna) where the pager having that ID code is located.

Therefore, when the pager is called at the next time, the call can be made from the base station of that zone only because the control center knows the service zone where the pager is located. This allows effective use of frequency and enhanced transmission efficiency.

Next, an eighth embodiment of the present invention will be described. The pager of the eighth embodiment has the same configuration as the pager of the third embodiment. Therefore, the description of the pager is omitted.

Figure 22:
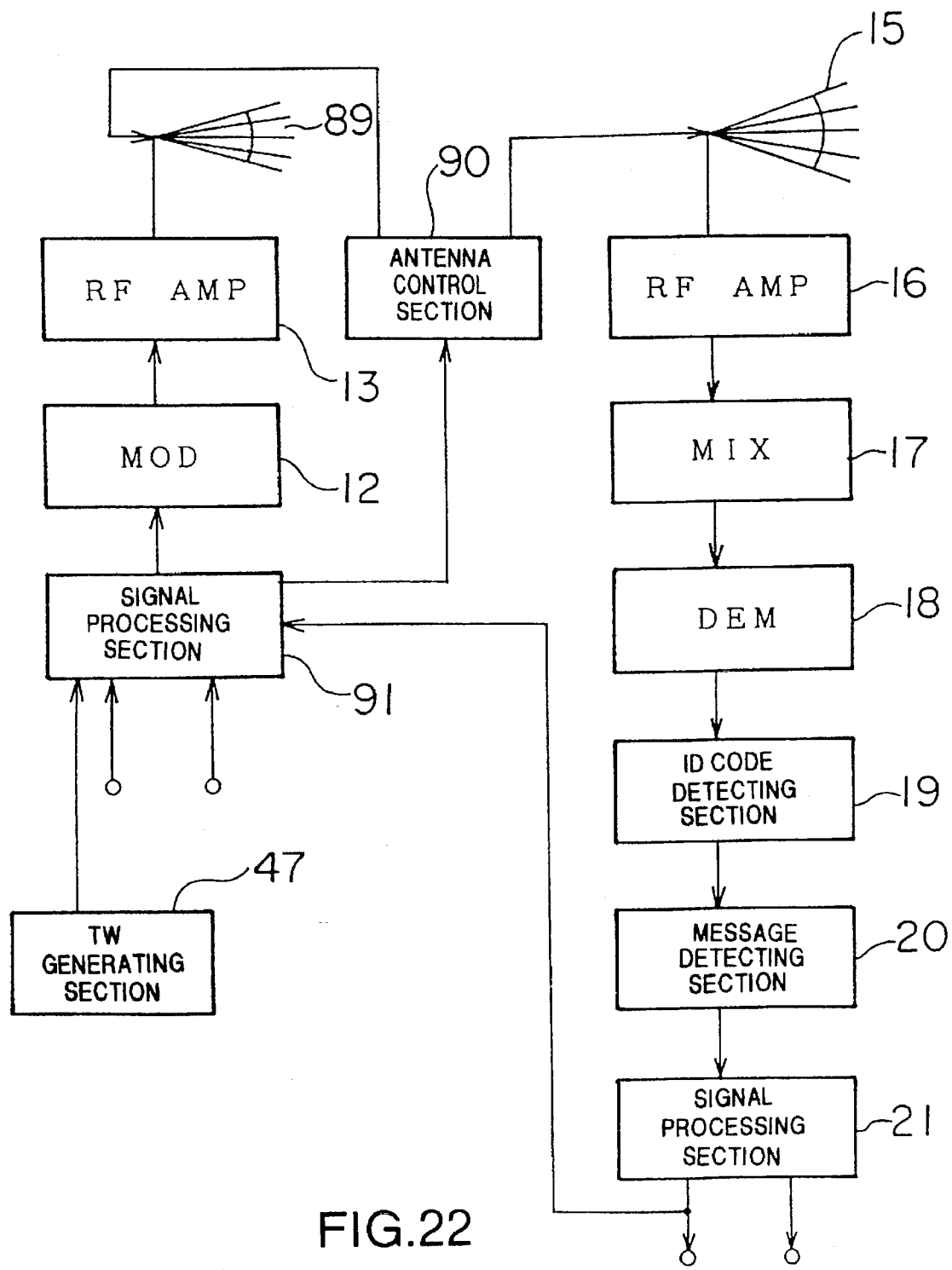
FIG. 22 is a block diagram of a base station of a eighth embodiment.

FIG. 22 is a block diagram for a base station of the eighth embodiment. Since the configuration of the base station of the eighth embodiment is basically the same as that of the third embodiment, like reference numerals are applied to essentially the same sections and elements, and the description of these sections and elements is omitted. Only the different sections and elements will be described.

In the eighth embodiment, a scanning antenna 89 is installed in place of the omnidirectional antenna 14 of the third embodiment. Also, an antenna control section 90 is provided that is connected to the scanning antenna 89 and the scanning antenna 15. This embodiment does not have the RF switching section 49 and the RF switching section 50 of the third embodiment.

The antenna control section 90 carries out the scanning control of the scanning antenna 89 and the scanning control of the scanning antenna 15 synchronously in accordance with the processing timing of timing word sent from a signal processing section 91. Therefore, the two-way communication can be made when the scanning antenna 89 and the scanning antenna 15 face the pager, so that wasteful radio waves are not generated in the direction where the pager is absent, by which the use efficiency of frequency can be enhanced and high sensitivity of the two-way communication can be achieved.

In addition, if the location information of the pager is known in advance, these effects can be further increased.

Next, a ninth embodiment of the present invention will be described. The pager of the ninth embodiment has the same configuration as the pager of the third embodiment.

Figure 23:
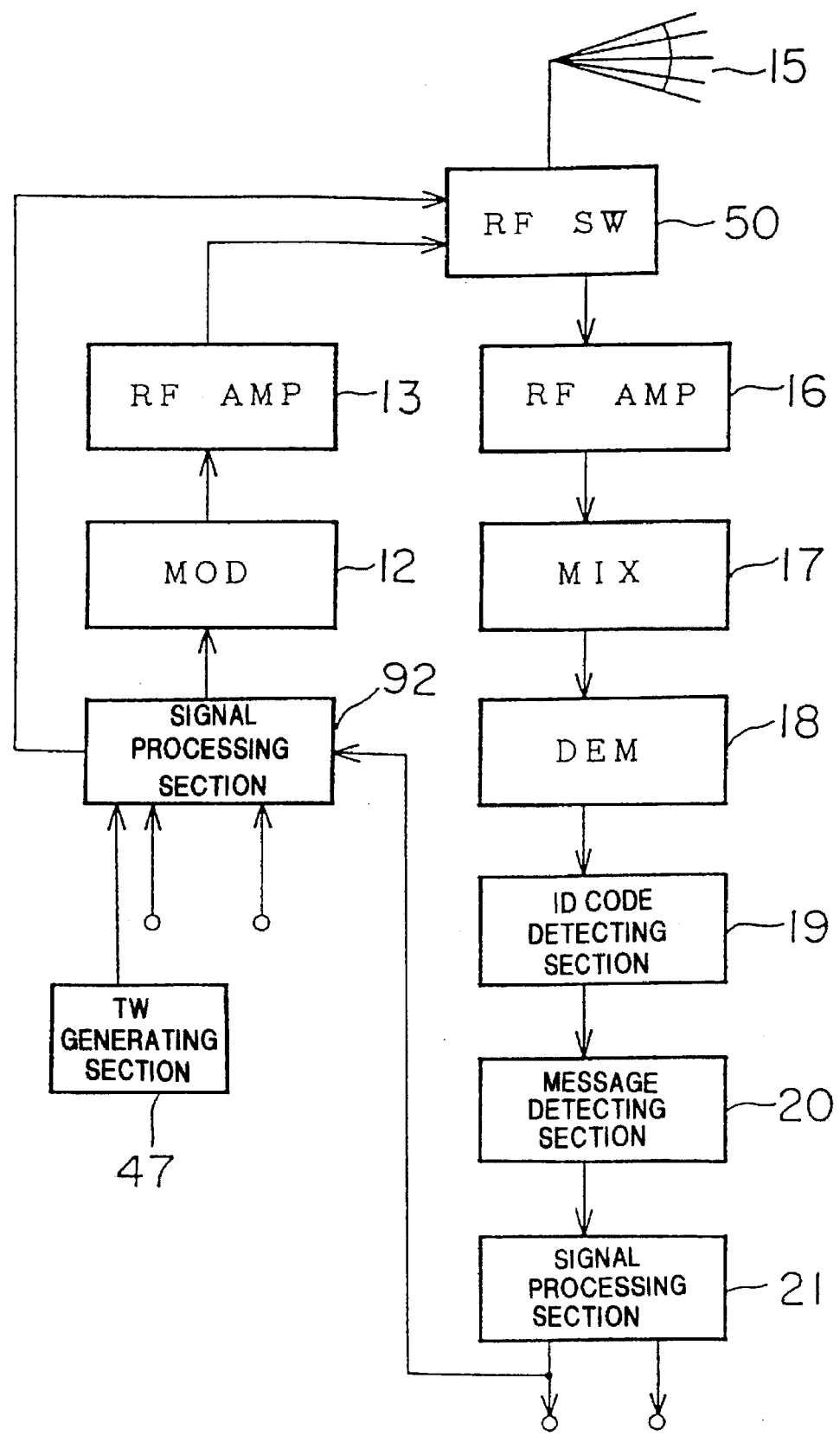
FIG. 23 is a block diagram of a base station of a ninth embodiment.

FIG. 23 is a block diagram of a base station of the ninth embodiment. Since the configuration of the pager of the ninth embodiment is basically the same as that of the third embodiment, like reference numerals are applied to essentially the same sections and elements, and the description of these sections and elements is omitted. Only the different sections and elements will be described.

The ninth embodiment does not have the omnidirectional antenna 14 and the RF switching section 49 of the third embodiment. In the ninth embodiment, the RF amplifying section 13 is directly connected to the RF switching section 50.

Figure 24:
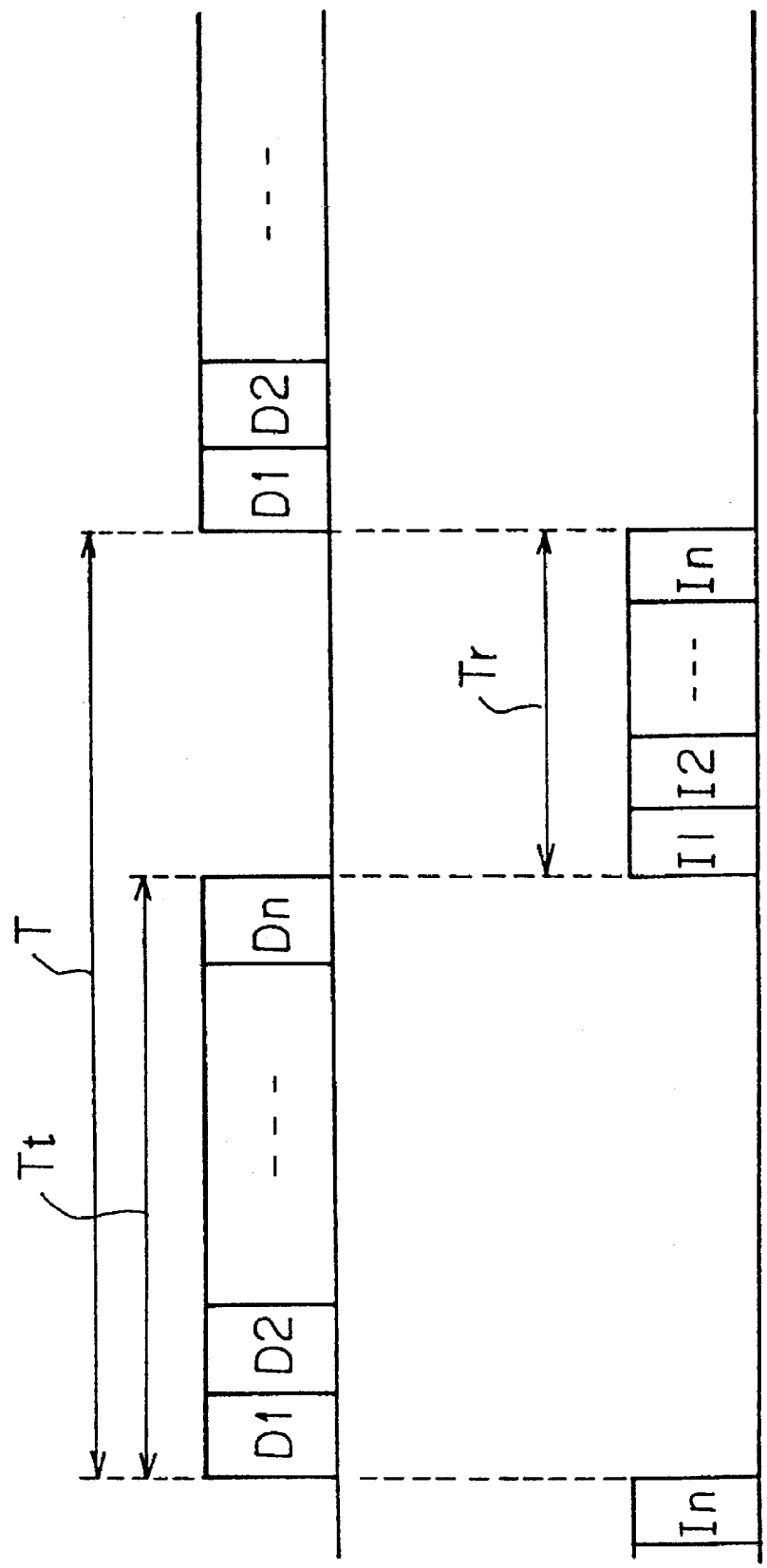
FIG. 24 is a view showing the transmission/reception timing at a base station.

A signal processing section 92 transmits signals for each of divided directions D1 to Dn at the first half portion Tt of the unit scanning period T of the scanning antenna 15 as shown in FIG. 24. The pager transmits signals for each of divided directions I1 to In at the second half portion Tr of the unit scanning period T.

This allows the coincidence of the base station transmission frequency with the base station reception frequency, so that effective use of frequency can be ensured.

Figure 25:
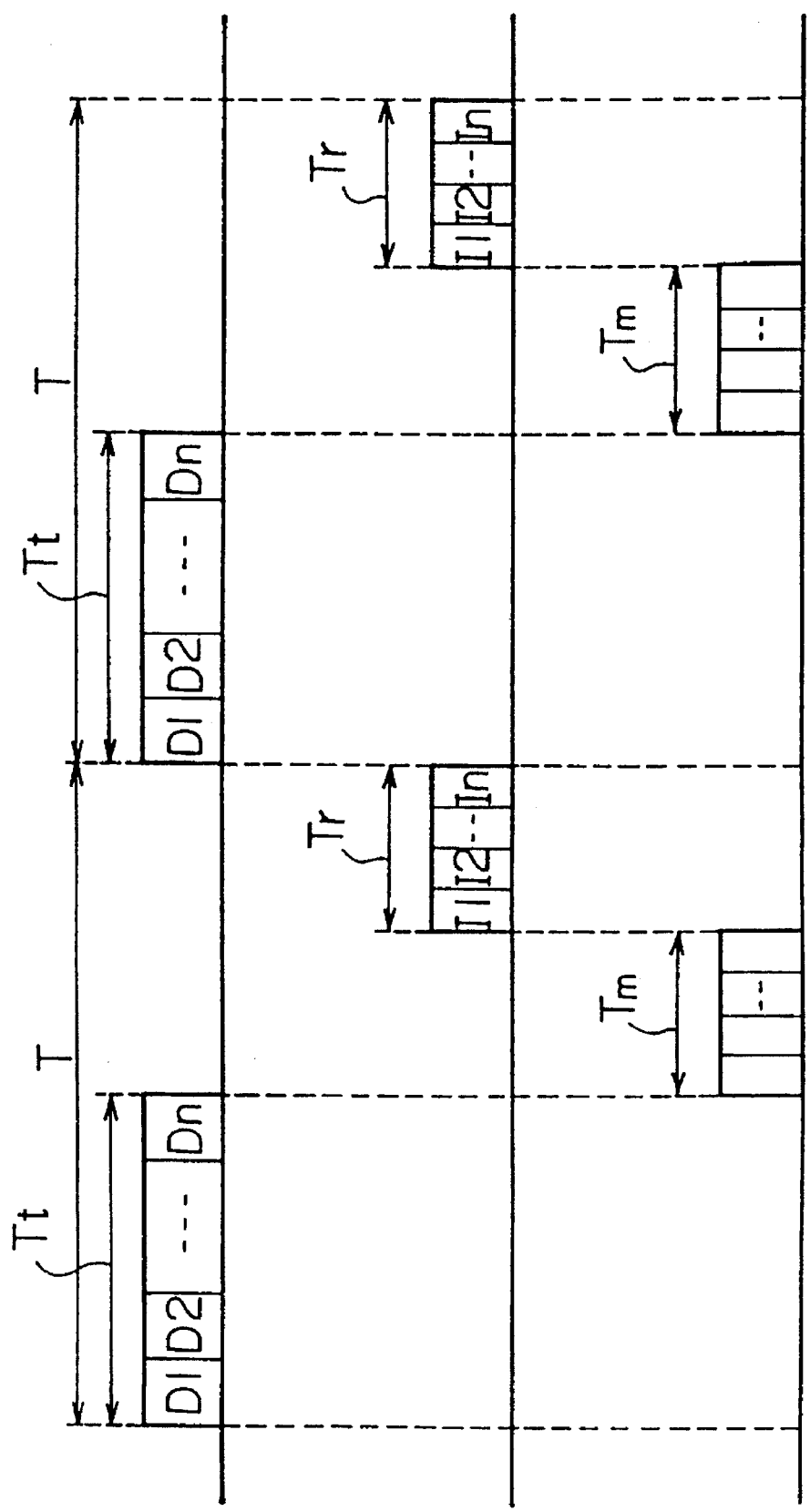
FIG. 25 is a view showing the signal arrangement for communication between pagers.
Figure 26:
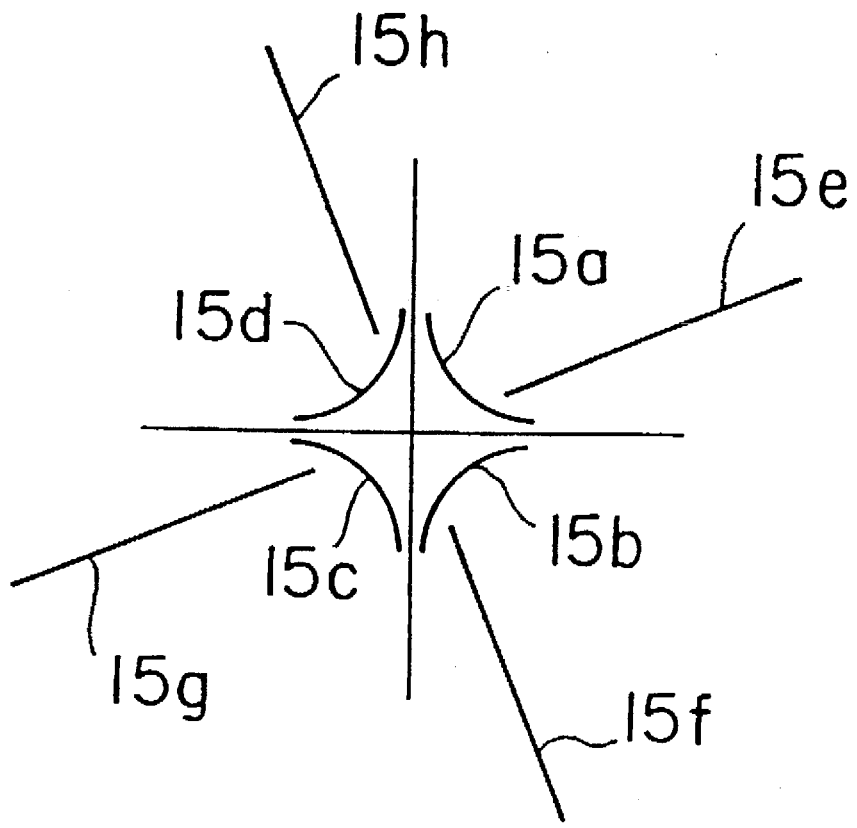
FIG. 26 is a multi-face configuration view of a scanning antenna.

Further, a time interval Tm is provided between the first half portion Tt and the second half portion Tr of the unit scanning period T as shown in FIG. 25, and this time interval can be used for the communication between pagers.

In the aforementioned embodiments, a pager has been used as a mobile station as an example. However, the mobile station of the present invention is not limited to a pager, but may be a two-way radio communication device of cellular system or a data communication device.

Further, in the aforementioned embodiments, the directivity direction of the scanning antenna may be such as to allow not only horizontal scanning but also vertical scanning so that even if the scanning antenna is positioned on a high tower, the signals from the pager located near the tower can be received. When signals are sent from such a scanning antenna, the output of transmission to a place distant from the tower may be high, and the output of transmission to a place near the tower may be low.

Still further, in the aforementioned embodiments, the scanning antenna 15 may be divided into, for example, four faces 15a to 15d arranged at 90 degrees so that the directivity direction 15e to 15h composed by the respective faces are always separated 90 degrees from each other. This can shorten the scanning time and can reduce the interference due to the same frequency in the case of transmission.

As described above, in the present invention, when a mobile station detects the self station code, it sends the self station code to a base station by using weak radio waves. The base station catches the weak radio waves sent from the mobile station by changing the directivity direction using a scanning antenna, and detects the mobile station code included in the reception signals. This tells the requester that the call of mobile station has surely been made. Thus, the notification that the mobile station has surely received the call from the base station is reliably conveyed by the weak radio waves from the mobile station to the base station. That is to say, the use of a scanning antenna allows the use of weak radio waves for the transmission from the mobile station to the base station. Therefore, the power consumption of the mobile station is low, and the configuration of the transmission circuit at the mobile station for transmitting weak radio waves can be made small-scale.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mobile communication system having a base station and a plurality of mobile stations, comprising:

self station code detecting means, which is installed in each mobile station, for detecting transmission of a self station code from said base station;

self station code transmitting means, which is installed in said mobile station, transmitting the self station code to said base station when said self station code detecting means detects the transmission of the self station code from said base station;

a scanning antenna, which is installed on said base station, and has a directivity, for scanning directivity directions;

mobile station code detecting means, which is installed in said station, for detecting a mobile station code included in reception signals received by said scanning antenna;

an omnidirectional antenna, which is installed on said base station and has no directivity, for transmitting the transmission signal including the mobile station code to all directions;

answer back means, which is installed in said base station, for transmitting the mobile station code detected by said mobile station code detecting means and an answer back signal from said omnidirectional antenna when said mobile station code detecting means detects the mobile station code;

answer back receiving means, which is installed in said mobile station, for receiving the mobile station code for self station and the answer back signal from said answer back means of said base station;

repeatedly executing means, which is installed in said mobile station, for making said self station code transmitting means repeatedly execute the transmission of the self station code to said base station as long as said answer back signal receiving means does not receive the mobile station code and the answer back signal; and stopping means, which is installed in said mobile station, for stopping the transmission of the self station code to said base station performed by said self station code transmission means by stopping an operation of said repeatedly executing means when said answer back receiving means receives the mobile station code for self station and the answer back signal.

2. A mobile communication system having a base station and a plurality of mobile stations, comprising:

self station code detecting means, which is installed in each mobile station for detecting transmission of a self station code from said base station;

self station code transmitting means, which is installed in said mobile station, for transmitting the self station code to said base station when said self station code detecting means detects the transmission of the self station code from said base station;

a scanning antenna which is installed on said base station, and has a directivity, for scanning directivity directions;

mobile station code detecting means, which is installed in said base station, for detecting a mobile station code included in reception signals received by said scanning antenna;

timing signal transmitting means, which is installed in said base station, for transmitting non-modulated timing signals from said scanning antenna for each of a plurality of divided directivity directions of said scanning antenna;

power value detecting means, which is installed in said mobile station, for receiving the timing signal sent from said timing signal transmitting means of said base station, and detecting power value of the received timing signal; and transmission control means, which is installed in said mobile station, for operating said self code transmitting means in divided interval of directivity direction of said scanning antenna which transmits said timing signal when the power value detected by said power value detecting means is above a predetermined level.

3. A mobile communication system according to claim 2, further comprising code transmitting means which is installed in said base station, for transmitting, upon receipt of a request for a call of a predetermined mobile station, a code of said predetermined mobile station from an omnidirectional antenna by means of a carrier with the same frequency as that of a carrier of said timing signal in the period of time when said timing signal transmitting means does not transmit timing signals.

4. A mobile communication system having a base station and a plurality of mobile stations, comprising:

self station code detecting means which is installed in each mobile station, for detecting transmission of a self station code from said base station;

self station code transmitting means, which is installed in said mobile station for transmitting the self station code to said base station when said self station code detecting means detects the transmission of the self station code from said base station;

a scanning antenna which is installed on said base station, and has a directivity, for scanning directivity directions; and mobile station code detecting means, which is installed in said base station, for detecting a mobile station code included in reception signals received by said scanning antenna;

timing word transmitting means, which is installed in said base station, for transmitting a modulated timing word from said scanning antenna for each of a plurality of divided directivity directions of said scanning antenna;

timing word detecting means, which is installed in said mobile station for detecting a timing word by receiving and demodulating the timing word transmitted from said timing word transmitting means of said base station;

transmission control means, which is installed in said mobile station operating, when said timing word detecting means detects a timing word, said self station code transmitting means in the divided time interval of the directivity direction of said scanning antenna which has transmitted said timing word; and code transmitting means, which is installed in said base station, for transmitting, upon receipt of a request for call of a predetermined mobile station, a code of said predetermined mobile station from an omnidirectional antenna by modulating in the same modulation mode as that of said timing word in the period of time when said timing word transmitting means does not transmit timing words.

5. A mobile communication system having a base station and a plurality of mobile stations, comprising:

self station code detecting means, which is installed in each mobile station, for detecting transmission of a self station code from said base station;

self station code transmitting means, which is installed in said mobile station, for transmitting the self station code to said base station when said self station code detecting means detects the transmission of the self station code from said base station;

a scanning antenna, which is installed on said base station, and has a directivity, for scanning directivity directions; and mobile station code detecting means, which is installed in said base station, for detecting a mobile station code included in reception signals received by said scanning antenna;

code transmitting means, which is installed in said base station, for transmitting, upon receipt of a request for a call of a predetermined mobile station, a code of said predetermined mobile station from an omnidirectional antenna;

self station code instant transmitting means, which is installed in said mobile station, for transmitting the self station code to said base station as soon as said mobile station receives the self station code transmitted from said base station; and position detecting means, which is installed in said base station, for detecting the spatial position of said predetermined mobile station on the basis of the time when said code transmitting means transmits the code of said predetermined mobile station, the time when said base station receives the self station code sent from said self station code instant transmitting means of said mobile station, and the directivity direction which said scanning antenna faces when said mobile station code detecting means detects the mobile station code.

6. A mobile communication system having a plurality base station of the same configuration and a plurality of mobile stations, the system comprising:

self station code detecting means, which is installed in each mobile station, for detecting transmission of a self station code from said base station;

self station code transmitting means, which is installed in said mobile station, for transmitting the self station code to said base station when said self station code detecting means detects the transmission of the self station code from said base station;

a scanning antenna, which is installed on said base station, and has a directivity, for scanning directivity directions; and mobile station code detecting means, which is installed in said base station, for detecting a mobile station code included in reception signals received by said scanning antenna;

a control center for controlling said plurality of base stations;

antenna code transmitting means, which is installed in a respective one of said base stations, for transmitting an antenna code specific to said scanning antenna from said scanning antenna;

antenna code storing means, which is installed in said mobile station, for receiving and storing the antenna code sent from said antenna code transmitting means of said respective base station;

new antenna code transmitting means, which is installed in said mobile station, for comparing the antenna code sent from said antenna code transmitting means of said respective base station with the antenna code stored in said antenna code storing means, and transmitting a new antenna code and the self station code to corresponding base station when the above two antenna codes are different; and registering means, which is installed in said respective one of said base stations, for registering the new antenna code sent from said new antenna code transmitting means of said mobile station and the mobile station code in said control center as position information indicating the spatial position of said mobile station.

7. A mobile communication system according to claim 6, further comprising control means for controlling said plurality of base stations, which is installed in said control center, wherein said control means, upon receipt of a request for a call of a predetermined mobile station, determines a base station of a zone where said predetermined mobile station is located on the basis of the position information registered by said registering means, and executes the call of said predetermined mobile station by operating said determined base station.

8. A mobile communication system according to claim 7, further comprising:

a mobile station code transmitting scanning antenna, which is installed in said base station, and has a directivity, for scanning the directivity direction, and transmitting the code of a predetemined mobile station requested to call; and synchronizing means, which is installed in said base station, for synchronizing the directivity direction of said scanning antenna with the directivity direction of said mobile station code transmitting scanning antenna.

9. A mobile communication system having a base station and a plurality of mobile stations, comprising:

self station code detecting means, which is installed in each mobile station, for detecting transmission of a self station code from said base station;

self station code transmitting means, which is installed in said mobile station, for transmitting the self station code to said base station when said self station code detecting means detects the transmission of the self station code from said base station;

a scanning antenna, which is installed on said base station, a directivity, for scanning directivity directions;

mobile station code detecting means, which is installed in said base station, for detecting a mobile station code included in reception signals received by said scanning antenna;

scanning antenna transmission control means, which is installed in said base station, for transmitting the mobile station code from said scanning antenna;

operation control means, which is installed in said base station, for operating said scanning antenna transmission control means for each of a plurality of divided directivity directions of said scanning antenna for the first half period of one unit scanning period of said scanning antenna; and transmission control means, which is installed in said mobile station, for operating said self station code transmitting means for each of the plurality of divided directive directions of said scanning antenna for the second half period of said unit scanning period.

* * * * *